(12) United States Patent
Stam et al.

(10) Patent No.: US 8,583,331 B2
(45) Date of Patent: Nov. 12, 2013

(54) MONITORING AND AUTOMATIC EQUIPMENT CONTROL SYSTEMS

(71) Applicant: Gentex Corporation, Zeeland, MI (US)

(72) Inventors: Joseph S. Stam, Holland, MI (US);
Mark W. Pierce, Grandville, MI (US);
Jon H. Bechtel, Holland, MI (US);
William R. Spence, Holland, MI (US);
Robert R. Turnbull, Holland, MI (US);
El-Sayed Eid, Sierra Madre, CA (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 13/692,099

(22) Filed: Dec. 3, 2012

(65) Prior Publication Data
US 2013/0135475 A1    May 30, 2013

Related U.S. Application Data

(63) Continuation of application No. 10/783,131, filed on Feb. 20, 2004, now Pat. No. 8,326,483.

(60) Provisional application No. 60/495,906, filed on Aug. 18, 2003, provisional application No. 60/448,793, filed on Feb. 21, 2003.

(51) Int. Cl.
*B60Q 1/00*    (2006.01)
*G06F 19/00*    (2011.01)

(52) U.S. Cl.
USPC ................................. 701/49; 701/36

(58) Field of Classification Search
None
See application file for complete search history.

(56) References Cited

U.S. PATENT DOCUMENTS

| | | |
|---|---|---|
| 2,632,040 A | 3/1953 | Rabinow |
| 2,827,594 A | 3/1958 | Rabinow |
| 4,139,801 A | 2/1979 | Linares |
| 4,236,099 A | 11/1980 | Rosenblum |
| 4,357,558 A | 11/1982 | Massoni et al. |
| 4,376,909 A | 3/1983 | Tagmi et al. |
| 4,599,544 A | 7/1986 | Martin |
| 4,665,321 A | 5/1987 | Chang et al. |
| 4,692,798 A | 9/1987 | Seko et al. |
| 4,727,290 A | 2/1988 | Smith et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,930,742 A | 6/1990 | Schofield et al. |
| 4,967,319 A | 10/1990 | Seko |
| 5,036,437 A | 7/1991 | Macks |
| 5,072,154 A | 12/1991 | Chen |

(Continued)

FOREIGN PATENT DOCUMENTS

| | | |
|---|---|---|
| DE | 2946561 | 5/1981 |
| FR | 2641237 | 7/1990 |

(Continued)

OTHER PUBLICATIONS

Acklund, B. & Dickinson, A., Camera on a Chip, Solid-State Circuits Conference, 1996, 1996 IEEE International Feb. 28, 1996, pp. 22-25.

(Continued)

*Primary Examiner* — Michael J Zanelli
(74) *Attorney, Agent, or Firm* — Scott P. Ryan

(57) ABSTRACT

The present invention relates to monitoring and automatic control systems.

20 Claims, 30 Drawing Sheets

(56) References Cited

U.S. PATENT DOCUMENTS

| | | |
|---|---|---|
| 5,086,253 A | 2/1992 | Lawler |
| 5,124,549 A | 6/1992 | Michaels et al. |
| 5,182,502 A | 1/1993 | Slotkowski et al. |
| 5,187,383 A | 2/1993 | Taccetta et al. |
| 5,235,178 A | 8/1993 | Hegyi |
| 5,329,206 A | 7/1994 | Slotkowski et al. |
| 5,416,318 A | 5/1995 | Hegyi |
| 5,426,294 A | 6/1995 | Kobayashi et al. |
| 5,434,407 A | 7/1995 | Bauer et al. |
| 5,451,822 A | 9/1995 | Bechtel et al. |
| 5,471,515 A | 11/1995 | Fossum et al. |
| 5,508,592 A | 4/1996 | Lapatovich et al. |
| 5,537,003 A | 7/1996 | Bechtel et al. |
| 5,550,677 A | 8/1996 | Schofield et al. |
| 5,592,510 A | 1/1997 | Van Brunt et al. |
| 5,614,788 A | 3/1997 | Mullins et al. |
| 5,660,454 A | 8/1997 | Mori et al. |
| 5,666,028 A | 9/1997 | Bechtel et al. |
| 5,715,093 A | 2/1998 | Schierbeek et al. |
| 5,796,094 A | 8/1998 | Schofield et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,912,534 A | 6/1999 | Benedict |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,049,171 A | 4/2000 | Stam et al. |
| 6,097,023 A | 8/2000 | Schofield et al. |
| 6,130,421 A | 10/2000 | Bechtel et al. |
| 6,144,158 A | 11/2000 | Beam |
| 6,281,715 B1 | 8/2001 | DeClue et al. |
| 6,373,497 B1 | 4/2002 | McKnight et al. |
| 6,376,824 B1 | 4/2002 | Michenfelder et al. |
| 6,396,040 B1 | 5/2002 | Hill |
| 6,396,397 B1 | 5/2002 | Bos et al. |
| 6,480,180 B1 | 11/2002 | Moon |
| 6,515,271 B1 | 2/2003 | Shimizu |
| 6,806,485 B2 | 10/2004 | Jackson, Jr. |
| 6,836,290 B1 | 12/2004 | Chung et al. |
| 6,895,256 B2 | 5/2005 | Harma et al. |
| 6,980,092 B2 | 12/2005 | Turnbull et al. |
| 8,326,483 B2 | 12/2012 | Stam et al. |
| 2001/0040631 A1 | 11/2001 | Ewedemi et al. |
| 2002/0071037 A1 | 6/2002 | Haavisto |
| 2002/0176605 A1* | 11/2002 | Stafsudd et al. .............. 382/106 |
| 2002/0190856 A1 | 12/2002 | Howard |
| 2003/0085736 A1 | 5/2003 | Tinsley et al. |
| 2003/0173503 A1 | 9/2003 | Tocci et al. |
| 2003/0210334 A1 | 11/2003 | Sarwari |
| 2004/0201686 A1 | 10/2004 | Amling et al. |

FOREIGN PATENT DOCUMENTS

| | | |
|---|---|---|
| FR | 2726144 | 4/1996 |
| JP | 59117563 | 8/1984 |
| JP | 6014252 | 1/1994 |
| JP | 8166221 | 6/1996 |
| JP | 2001091618 | 4/2001 |
| JP | 2001213240 | 8/2001 |
| WO | WO8605147 | 9/1986 |

OTHER PUBLICATIONS

S. Hezel, A. Kugel and R. Mianner: "FPGA-based Template Matching using Distance Transforms", Proc. of the IEEE Symposium on Field-Programmable Custom Computing Machines, Napa, USA, 2002, Dec. 31, 2002, 10 pgs.

Hillebrand, M: "High speed camera system using a CMOS image sensor", Vehicles Symposium 2000, Oct. 5, 2000, pp. 656-661, ISBN: 0-7803-6363-9.

Witoonchart, P & Foulds, R : "Three-dimensional surface and volume measurements using a camera array", New Jersey Institute of Technology, Dec. 31, 2002, ISBN: 0-7803-7419-3.

Muramatsu, S: "Image processing device for automotive vision systems", Intelligent Vehicle Symposium, Jun. 21, 2002, ISBN: 0-7803-7346-4.

S. Parkes: "High-speed, Low-power, Excellent EMC: LVDS for On-board Data Handling", Proceedings of 6th International Workshop on Digital Signal Processing Techniques for Space Applications, IEEE 1998, Sep. 30, 1998, DOI: 10.1.1.118.758.

\* cited by examiner

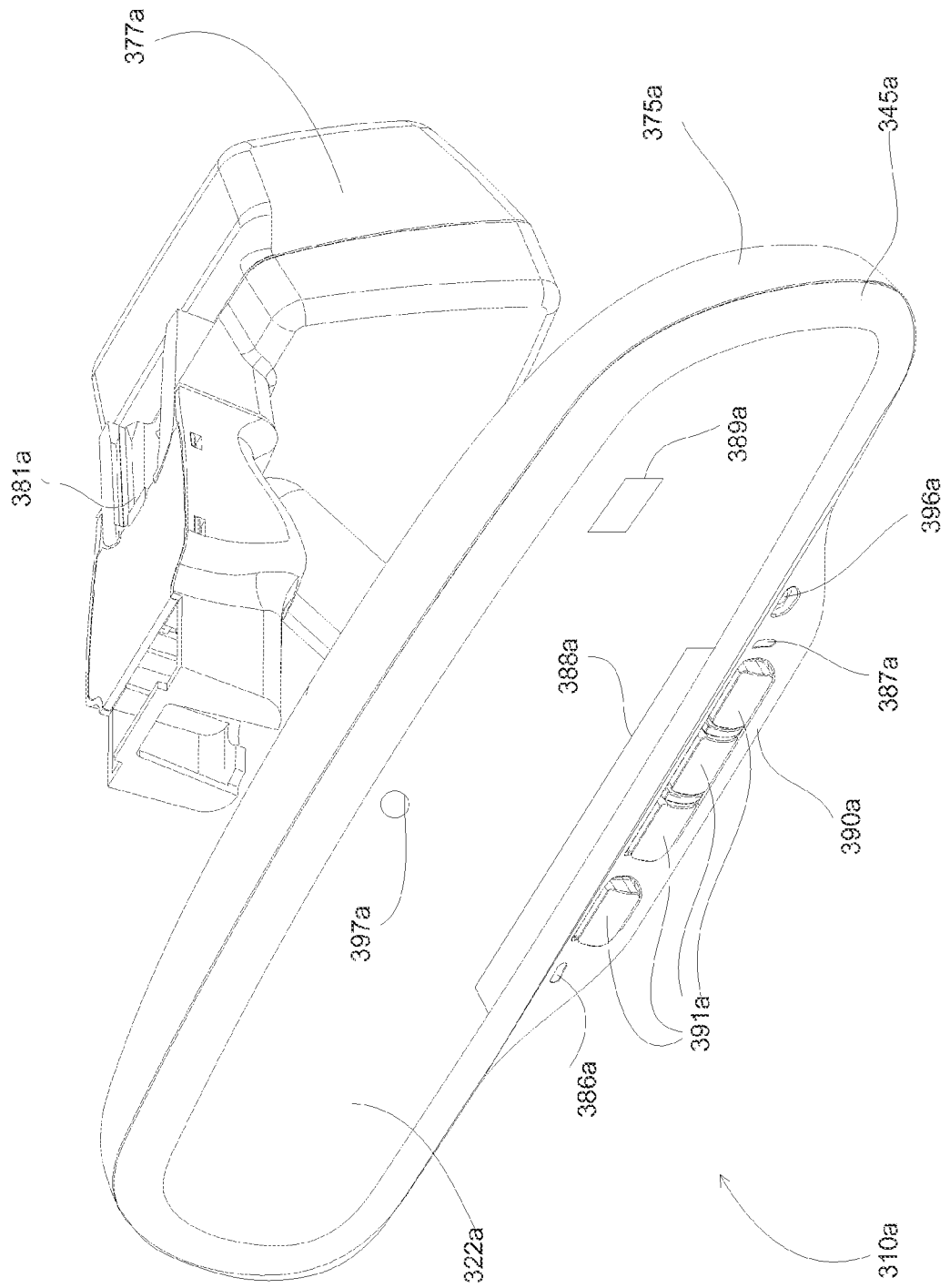

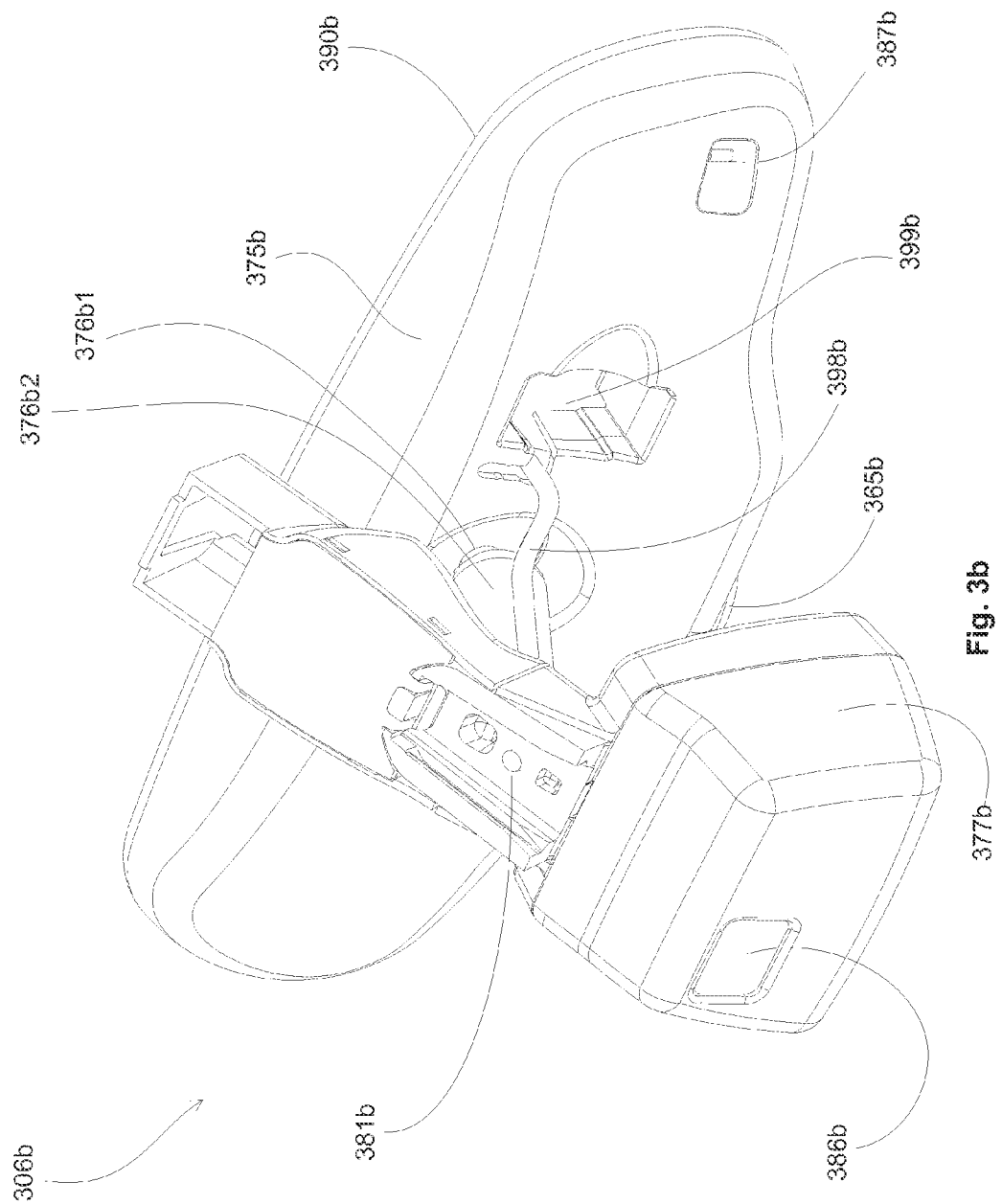

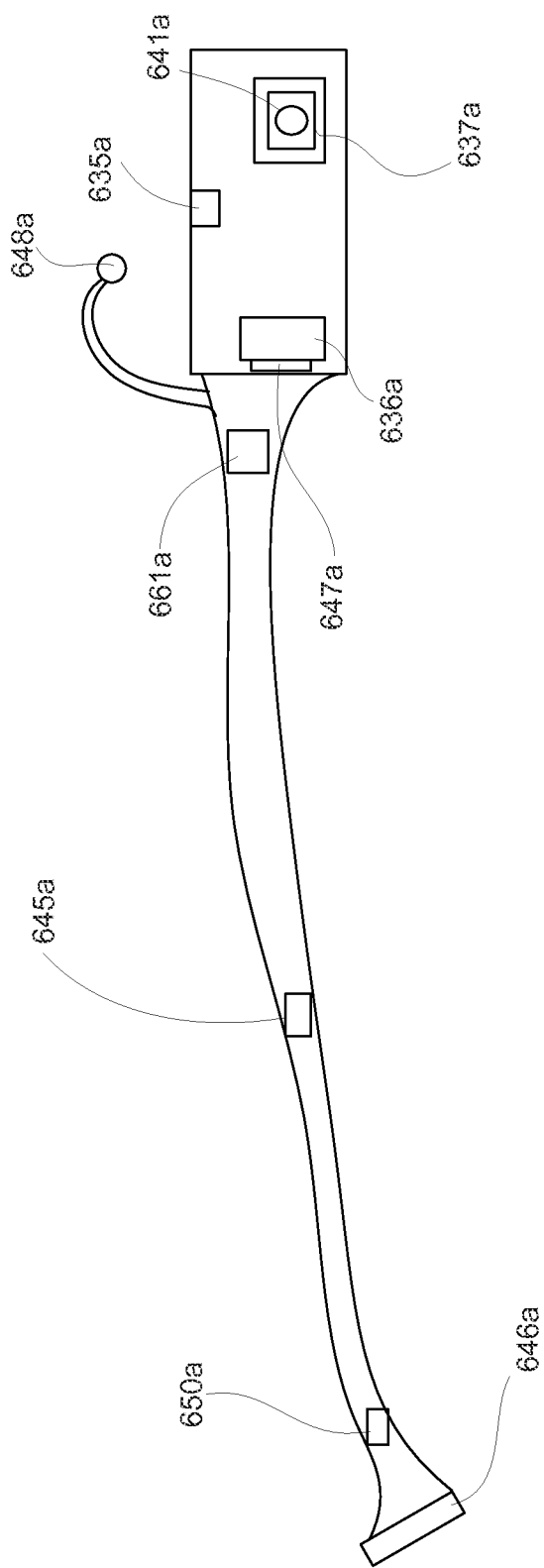
Fig.6.a

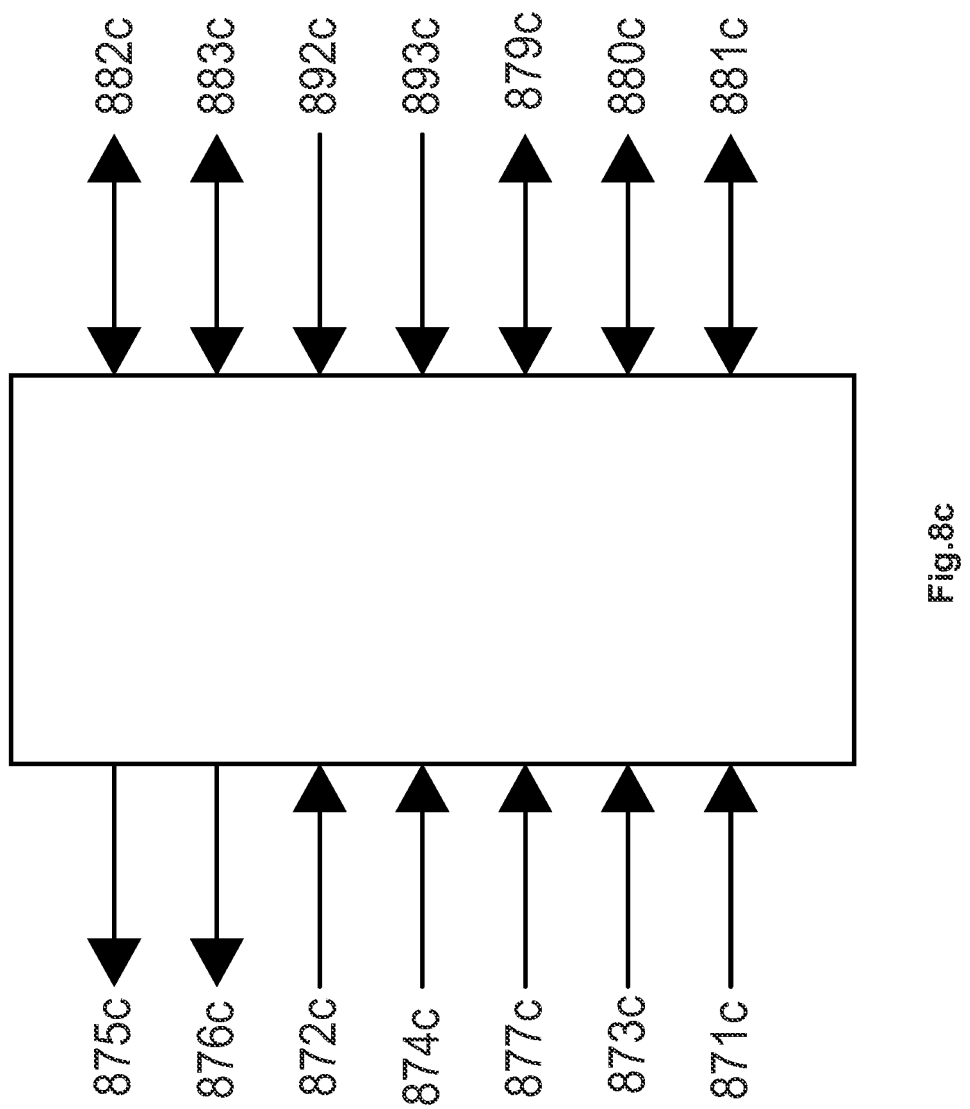

Microcontroller Signal Waveforms

LVDS Signal Waveforms —

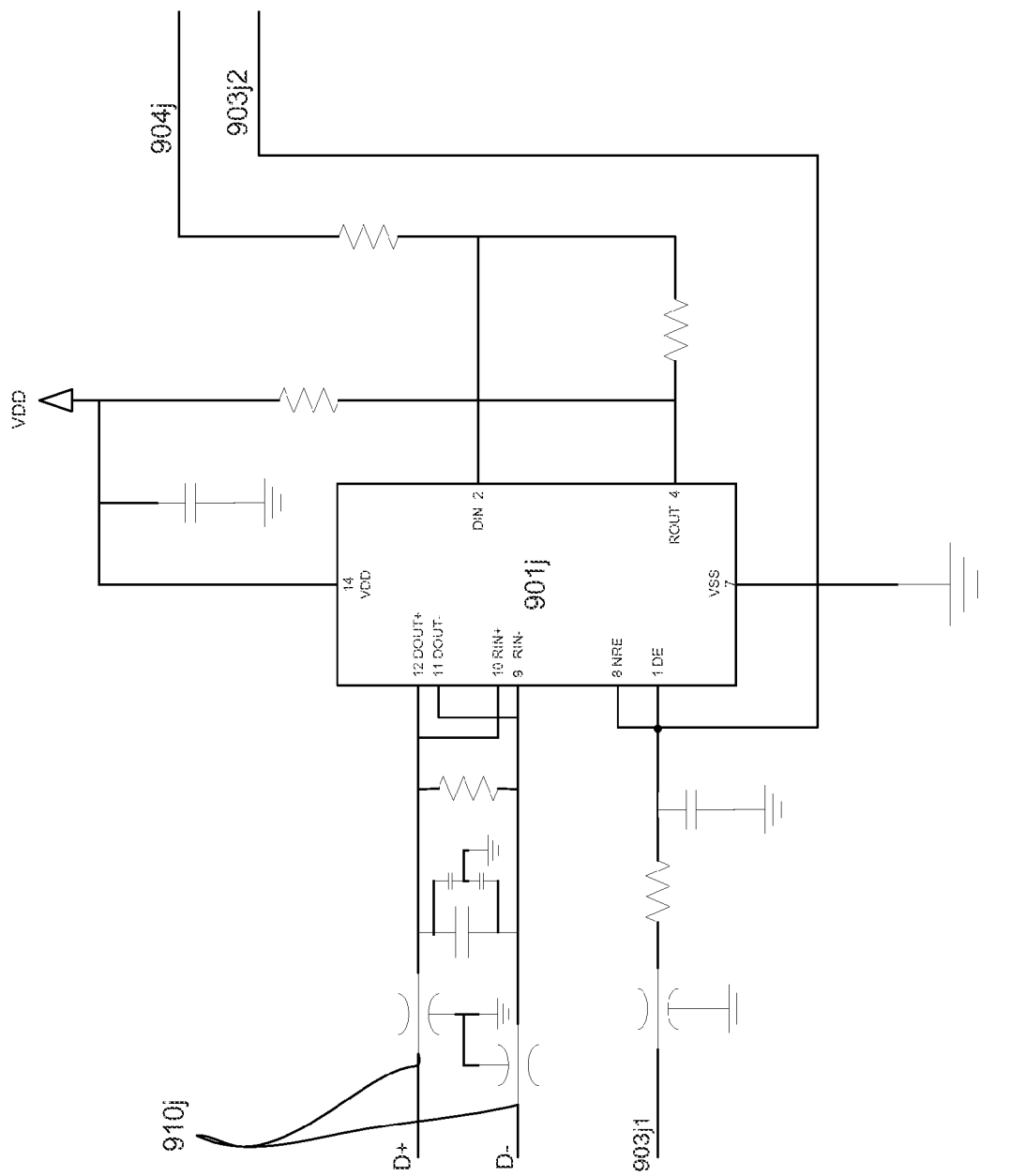

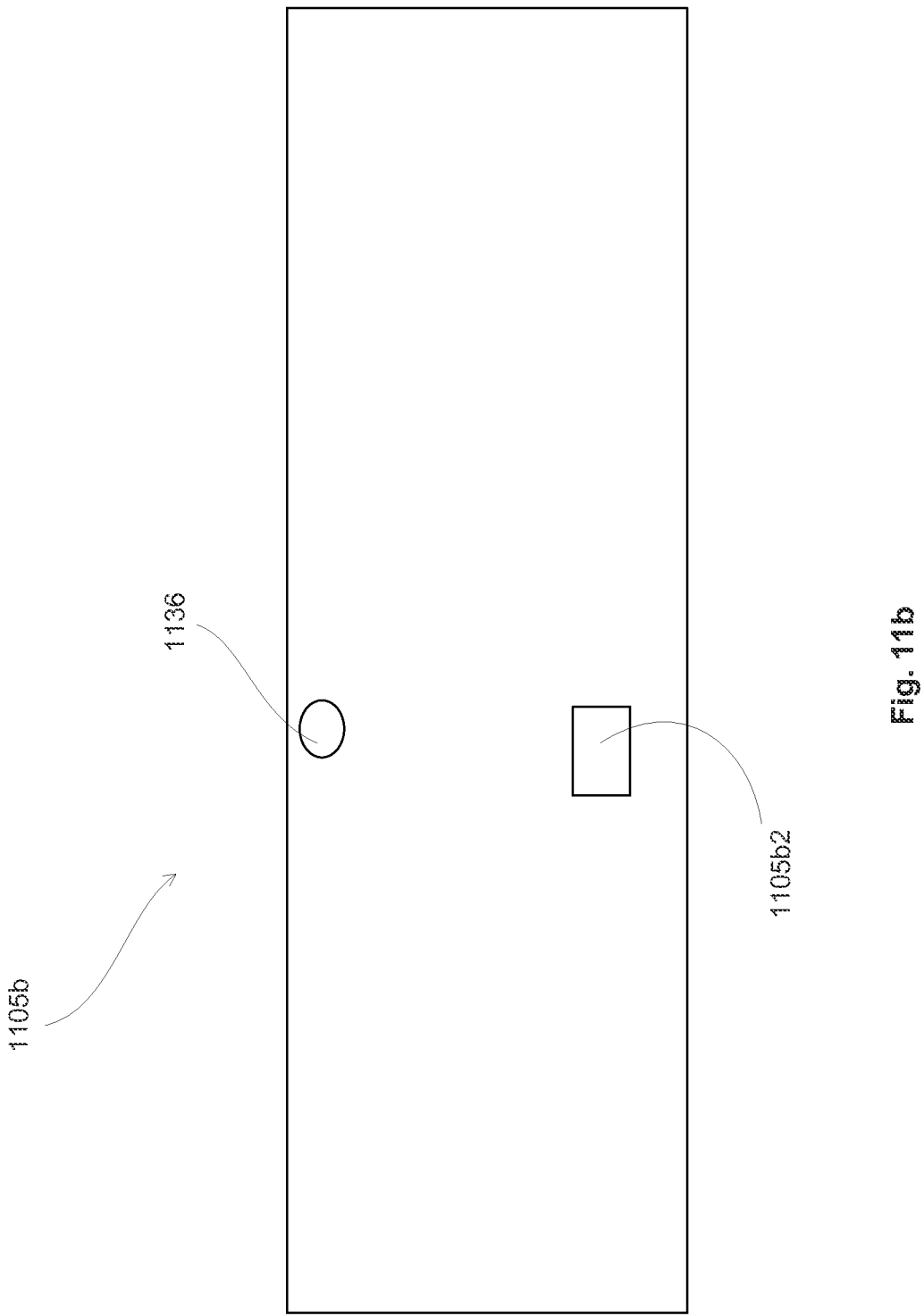

MONITORING AND AUTOMATIC EQUIPMENT CONTROL SYSTEMS

CROSS REFERENCE TO RELATED APPLICATIONS

The present application is a continuation of U.S. patent application Ser. No. 10/783,131, filed Feb. 20, 2004, entitled "MONITORING AND AUTOMATIC EQUIPMENT CONTROL SYSTEMS," which claims priority, under 35 U.S.C. §119(e), to U.S. provisional patent application Ser. Nos. 60/448,793, filed on Feb. 21, 2003, entitled "EXTERIOR LIGHT CONTROL ASSEMBLY," and 60/495,906, filed on Aug. 18, 2003, entitled "IMAGE ACQUISITION AND PROCESSING SYSTEM." The disclosures of these patent applications are incorporated herein in their entireties by reference.

BACKGROUND

Vehicle monitoring and automatic equipment control systems have been proposed that incorporate image sensor technology. Typically, these systems are configured to acquire images of a desired scene and present the images to a vehicle driver and, or, occupant on a display. Often times these systems additionally, or in lieu of a display, process the electronic image information to automatically control vehicle equipment.

What are needed are improved vehicle monitoring and automatic equipment control systems.

SUMMARY

Vehicle monitoring and automatic equipment control systems in accordance with the present invention provide improvements to known systems. In at least one embodiment, a vehicle monitoring and automatic equipment control system incorporates a number of discrete components into integrated devices.

In at least one embodiment an improved imager is provided.

In at least one embodiment an improved enhanced transceiver is provided.

In at least one embodiment an improved imager interconnection with a mother board and, or, daughter board is provided.

BRIEF DESCRIPTION OF THE FIGURES

FIG. 3a depicts a perspective view of an embodiment of an accessory and rearview mirror assembly;

FIG. 3b depicts a second perspective view of the accessory and rearview mirror assembly of FIG. 3a;

FIG. 5b depicts a second plan view of the opposite side of the mother board and daughter boards of FIG. 5a;

FIG. 6a depicts an embodiment of an imager board and interconnecting cable;

FIG. 8c depicts the pin configuration for an embodiment of a low voltage differential signal device with memory;

FIGS. 9a-9j depict various imager and processor configuration embodiments;

FIG. 11b depicts a second plan view of the mother board of FIG. 11a.

DETAIL DESCRIPTION

Figure 1:
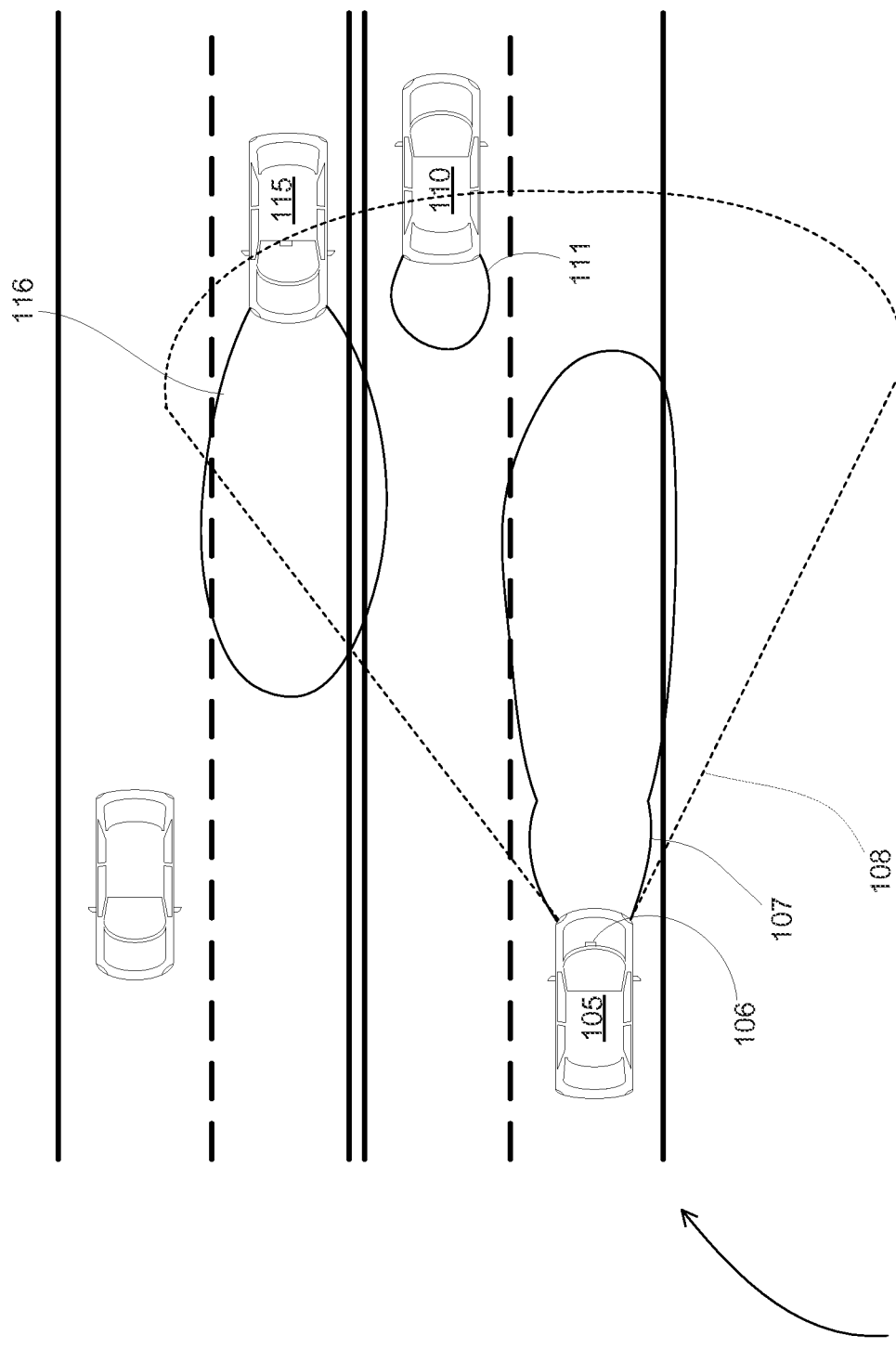
FIG. 1 depicts a plan view of a controlled vehicle relative a leading vehicle, an oncoming vehicle and another vehicle on a roadway.

Electronic image sensors vision systems and related automatic control systems have many potential applications in automobiles. For example, automatic vehicle exterior light control systems have been developed utilizing generally forward looking image sensors to detect the presence of other vehicles and automatically control exterior lights of a controlled vehicle to avoid imposing glaring light rays upon other drivers. Several other applications have been proposed or developed including: moisture sensing, adaptive cruise control, accident reconstruction systems, blind spot warning, night vision systems, rear vision systems, collision avoidance systems, lane departure warning systems, security systems, cabin monitoring systems, and others.

Such systems can generally be divided into two categories, those with a primary purpose of presenting an image, or series of images, to the driver of a controlled vehicle and those in which an image, or series of images, is analyzed by a processor in order to automatically perform some vehicle equipment related function. Some systems may provide both functions and in other systems a processor may enhance or augment a displayed image. In either case, it is almost always necessary to transmit an image signal from an imager to a processor and, or, display. In many embodiments of the present invention the transmitted image is a digitized image signal.

In some applications, the processor, and, or display to which the image is transmitted is located some distance from the imager. For example, consider an embodiment of an automatic vehicle exterior light control system integrated into an automatic dimming rear-view mirror. The imager is preferably located in an accessory module mounted to an attachment member to insure that the aim of the imager remains independent of a rearview mirror aim adjustment as disclosed in commonly assigned U.S. Provisional Patent application Ser. No. 60/448,793. A processor is preferably located on a mother board housed in the mirror housing. The processor may be configured to perform additional functions such as controlling the reflectance of an electro-optic mirror element, a compass, a voice recognition processor, a telemetry system, a telephone, an information displays, an information display driver, operator interfaces indicators, or the like. The image data must be transmitted from the imager board to the mother board on which the processor is located. Other examples of remote imager locations are readily apparent. One or more image sensors may be located in various places in, or on, a controlled vehicle to monitor various fields of view. These imagers may transmit data to one or more processors centrally located or distributed throughout the vehicle. These image sensors may transmit images to one or more displays that may be located in convenient viewing positions for the driver and, or, occupants.

In the environment of a typical vehicle, it is desirable to manage electromagnetic interference (EMI). This includes both limiting the radiated emissions from an electronic device, as well as, insuring that the device is not susceptible to emissions from other sources. Stringent requirements are often imposed by automobile original equipment manufactures (OEMs) that require testing and measuring emissions from a device as well as tests in which a device is subjected to an electromagnetic field to insure the device does not malfunction.

Designing an electronic vision system to meet these requirements is a difficult challenge. This is due largely to the high data rates associated with transmitting digital images. A typical electronic image sensor may contain anywhere from a few thousand to over a million pixels, each of which having an output that is typically digitized at 8 or 10 bits. In many of the applications described herein, several images are acquired and transmitted every second. This results in digital data transmission rates from several kilo-bauds to several mega-bauds. This high data transmission rate can produce high levels of electromagnetic radiation. One method to reduce the data transmission rate is disclosed in commonly assigned U.S. patent application Ser. No. 60/531484, entitled One-Zero Serial Communication, filed on Dec. 19, 2003, the entire disclosure of which is incorporated herein in its entirety by reference. The mother board/imager board interconnections described herein provide additional electromagnetic interference advantages.

In many cases it is desirable to have multiple vision systems performing multiple functions or multiple image sensors providing multiple views to the driver. For example, a driver would benefit from having both an automatic exterior light control system and a moisture sensing system to automatically control a vehicle's exterior lights its windshield wipers and, or, defogger. Automatic vehicle exterior light control systems are described in commonly assigned U.S. Pat. Nos. 5,990,469, 6,008,486, 6,130,421, 6,130,448, 6,255,639, 6,049,171, 5,837,994, 6,403,942, 6281,632, 6,281,632, 6,291,812 and U.S. patent application Ser. Nos. 09/448,364, 09/538,389, 09/605,102, 09/678,856, 09/800,460, 09/847,197, 09/938,774, 09/491,192, 60/404,879, 60/394,583, 10/235,476, 10/208,142, the disclosures of which are incorporated in their entireties herein by reference. Automatic moisture sensing systems are described in commonly assigned U.S. Pat. Nos. 5,923,027 and 6,313,457 and U.S. patent application Ser. Nos. 09/970,962 and 09/970,728, the disclosures of which are incorporated in their entireties herein by reference.

An imager for an automatic exterior light control system is preferably focused for far-field imaging to detect headlights of oncoming vehicles and taillights of leading vehicles and further preferably has color discrimination capability to distinguish red light sources from other objects. An imager for a moisture sensing system is preferably focused on the windshield (near field) to image the moisture and preferably has a wide field of view. One option to solve these conflicting requirements is to provide a variable lens that can be switched to perform each function. Another option is to provide a lens with high depth of field that images both near-field moisture and far-field light sources. Complex software methods are typically employed when such lens systems are incorporated to distinguish near and far field objects.

To optimally perform both functions it is advantageous to employ two separate imagers, each with optics designed for a specific function. At least one embodiment of the present invention provides an economically efficient method of sharing substantially all support electronics and mechanical structures to allow a second imager to be added very cost efficiently. The incremental cost for the second imager may be the cost of the image sensor and optics, which is typically a small fraction of the total cost. Other applications requiring multiple imagers use stereoscopic vision wherein two imagers are used spaced apart from one another to provide capability for accurate distance measurement of objects. The techniques presented herein are also advantageous for these applications. Finally, the techniques of the present invention may also be used to add a third or more imager.

Turning now to FIG. 1, an embodiment of a controlled vehicle 105 having an accessory and rearview mirror assembly 106, exterior light rays 107 and a glare area 108 is depicted on a divided highway 100. The controlled vehicle is shown in relationship to a leading vehicle 110 having taillight rays 111 and an oncoming vehicle 115 having headlight rays 116.

Figure 2:
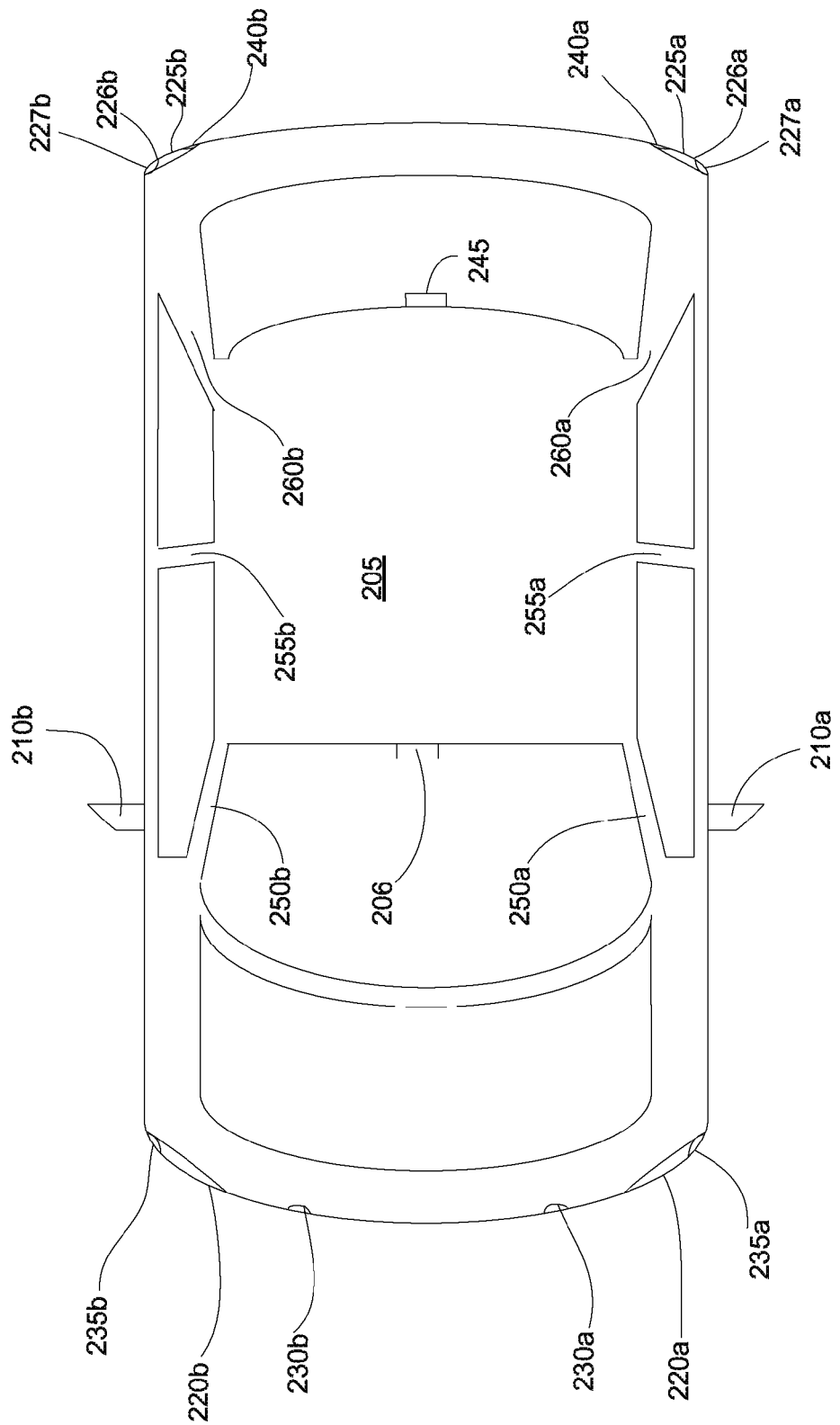
FIG. 2 depicts a plan view of an embodiment of a controlled vehicle.

With additional reference to FIG. 2, an embodiment of a controlled vehicle 205 is depicted as comprising an accessory and rearview mirror assembly 206. The controlled vehicle also has a driver's side rearview mirror assembly 210a and a passenger's side rearview mirror assembly 210b. Preferably, the rearview mirror assemblies comprise electro-optic mirror elements as described in many commonly assigned U.S. patents and patent applications. The controlled vehicle further comprises headlight assemblies 220a, 220b; front foul weather lights 230a, 230b; front turn signal/hazard indicators 235a, 235b; taillight assemblies 225a, 225b; rear turn signal indicators 226a, 226b; rear hazard indicators 227a, 227b; backup indicators 240a, 240b and a center high mounted stop light (CHMSL). Preferably, the headlight assemblies are bi-xenon and, or, repositionable. It should be understood that the controlled vehicle may comprise additional exterior lights, may comprise various combinations of the exterior lights depicted in FIG. 2 or may combine any of the exterior lights shown in FIG. 2 with additional exterior lights. It should be understood that any of the exterior lights may be provided with dimming means, repositioning means, focusing means, color changing means, aiming means or combinations thereof for altering an associated exterior light characteristic. With further reference to FIG. 2, the controlled vehicle comprises A-pillars 250a, 250b; B-pillars 255a, 255b and C-pillars 260a, 260b. It should be understood that any of the lighting assemblies, rearview mirror assemblies, pillars or combinations thereof provide suitable mounting locations for additional imagers, or for an imager in lieu of, an imager in the accessory and rearview mirror assembly 206. It should be understood that any imager assembly may comprise a repositioning means for selectively obtaining alternate desired fields of view with a single imager. An imager may be configured to be automatically repositioned as a function of at least one pitch sensor, at least one yaw sensor, at least one steering sensor, at least one speed sensor, any one thereof, a subcombination or combination thereof.

Turning now to FIGS. 3a and 3b, there is shown an embodiment of an accessory and rearview mirror assembly 306a, 306b. The accessory and rearview mirror assembly comprises a stationary housing 377a, 377b and a repositional mirror housing 375a, 375b mounted to an attachment member 381a, 381b. Preferably, the stationary housing contains at least one imager board, at least one processor, at least one compass sensor, at least one supplemental light source, at least one moisture sensor, at least one automatic exterior light control circuit, at least one microphone, at least one speaker, any one thereof, a sub-combination thereof or combinations thereof. Preferably, the repositional mirror housing 375a, 375b contains an electro-optic mirror element 322a, at least one electro-optic mirror element automatic drive control circuit, a daytime running light automatic control circuit, an automatic exterior light control circuit; at least one information display 388a, 389a, at least one glare light sensor 396a, 397a, at least one indicator 386a, 387a, at least one operator interface 391a, at least one microphone 365b, at least one ambient light sensor 387b, at least one wire harness 398b and at least one vehicle equipment connector 399b. The accessory and rearview mirror assembly may also comprise a bezel 390b and, or, an extended viewing area mirror element 345a. It should be understood that a wire harness 398b may be routed out of the repositional mirror housing 375a, 375b, through a first pivot ball 376b1, mounting stem 376b2 and through a second pivot ball (not shown) into the stationary housing 377a, 377b.

Figure 4:
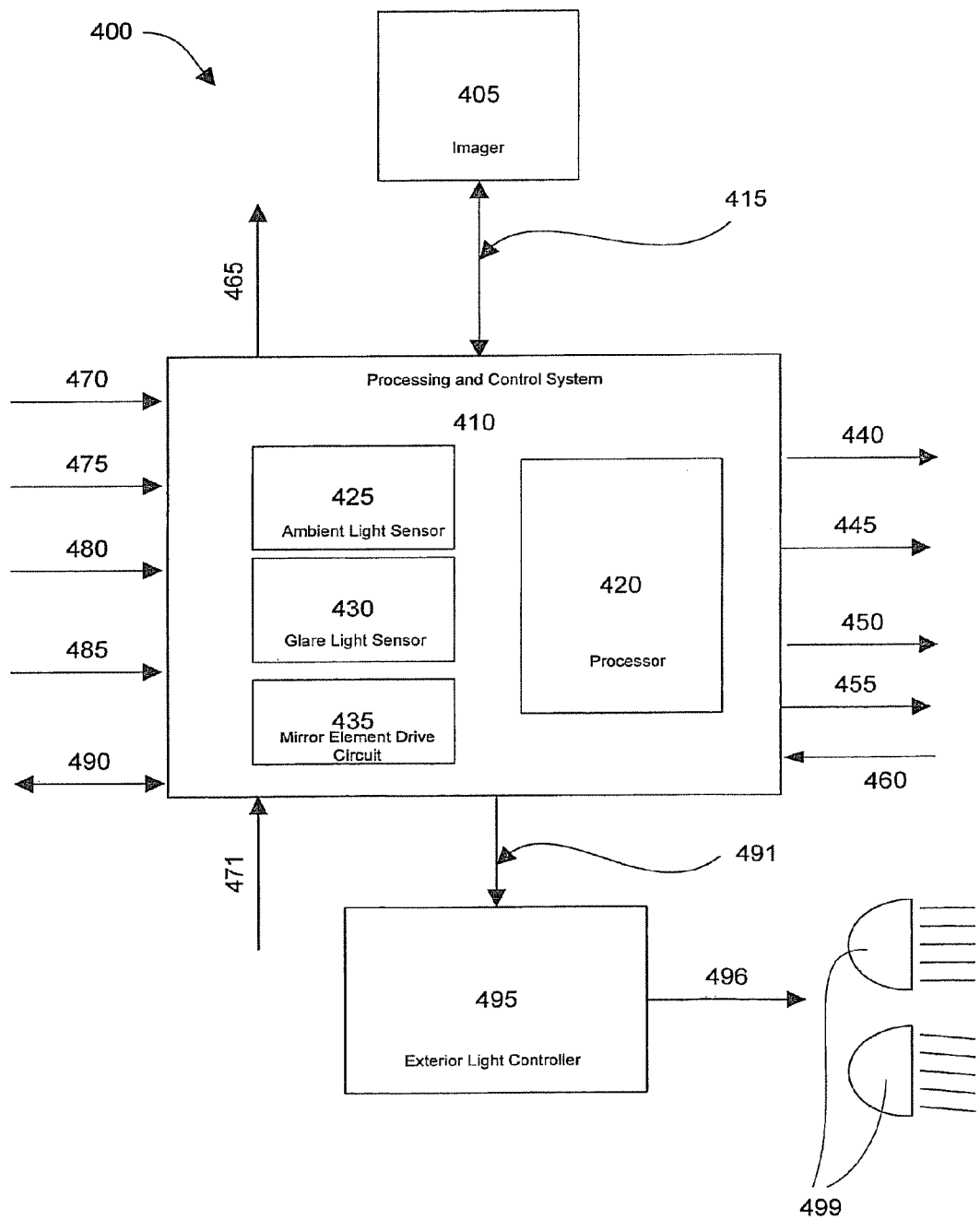
FIG. 4 depicts a block diagram for an embodiment of an automatic equipment monitoring and control system.

With reference now to FIG. 4, there is depicted a block diagram of an embodiment of an automatic vehicle equipment control system 400. As can be seen, an imager 405 is configured to communicate with a processing and control system 410 via a communication interface 415. It should be understood that the communication interface may be hardwired, radio frequency, fiber optics, light ray, sub-combinations thereof or combinations thereof. The processing and control system comprises at least one processor 420, at least one ambient light sensor, at least one glare light sensor 430, at least on electro-optic mirror element automatic drive control circuit 435, at least one electro-optic mirror element automatic drive control output 440, at least one information display output 445, at least one exterior light status indicator output 450, at least one pedestrian/bicyclist status indicator output 455, at least one pedestrian/bicyclist indicator override switch input 460, at least one windshield wiper and, or, defogger output 465, a controlled vehicle speed input 470, at least one electro-optic element reverse override input 475, at least one automatic/on/off switch input 480, at least one manual dimmer switch input 485, at least one vehicle bus interface 490, at least one exterior light controller output 491, at least one compass sensor input 471, any one thereof, a subcombination thereof or a combination thereof. The exterior light controller 495 may comprise a plurality of individual outputs 496 for independent control of various exterior lights 499. It should be understood that additional components, inputs and outputs may be provided and, or, individual components may be integrated with one another in subassemblies. For example, an exterior light assembly may comprise at least one light ray source, a repositioning means, a focusing means, an aiming means, a color changing means, a light ray emission control means, etc. The exterior light assembly may be configured to connect to a processing and control interface, such as a vehicle bus or the like, and to a vehicle electrical power source. It should be understood that a plurality of vehicle equipment sensor outputs are available from a vehicle data communication bus. It is preferable to acquire any desired sensor data from these otherwise available vehicle devices.

Figure 5A:
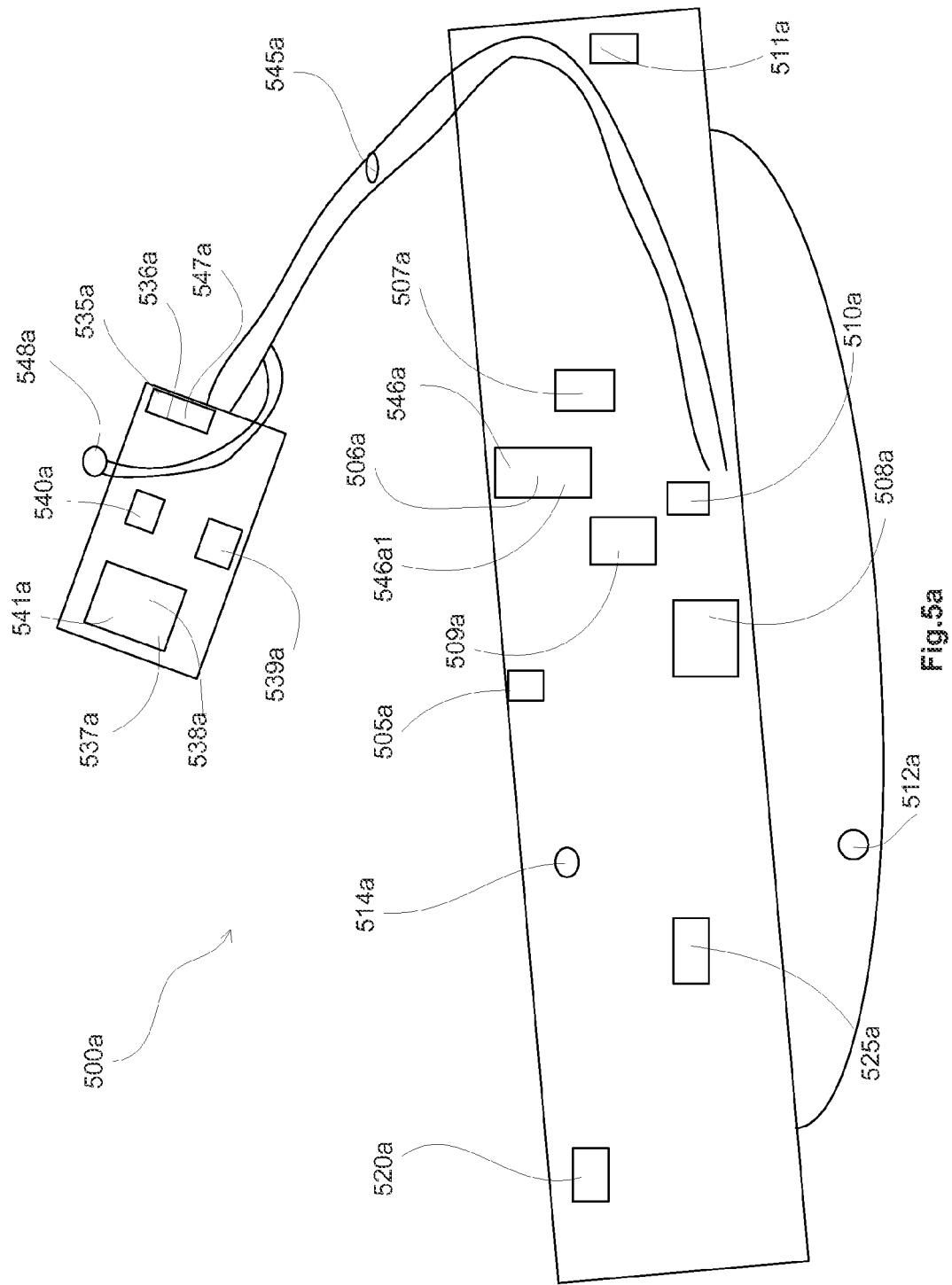
FIG. 5a depicts a plan view of an embodiment of a mother board, a daughter board and an imager board interconnected with one another.
Figure 5B:
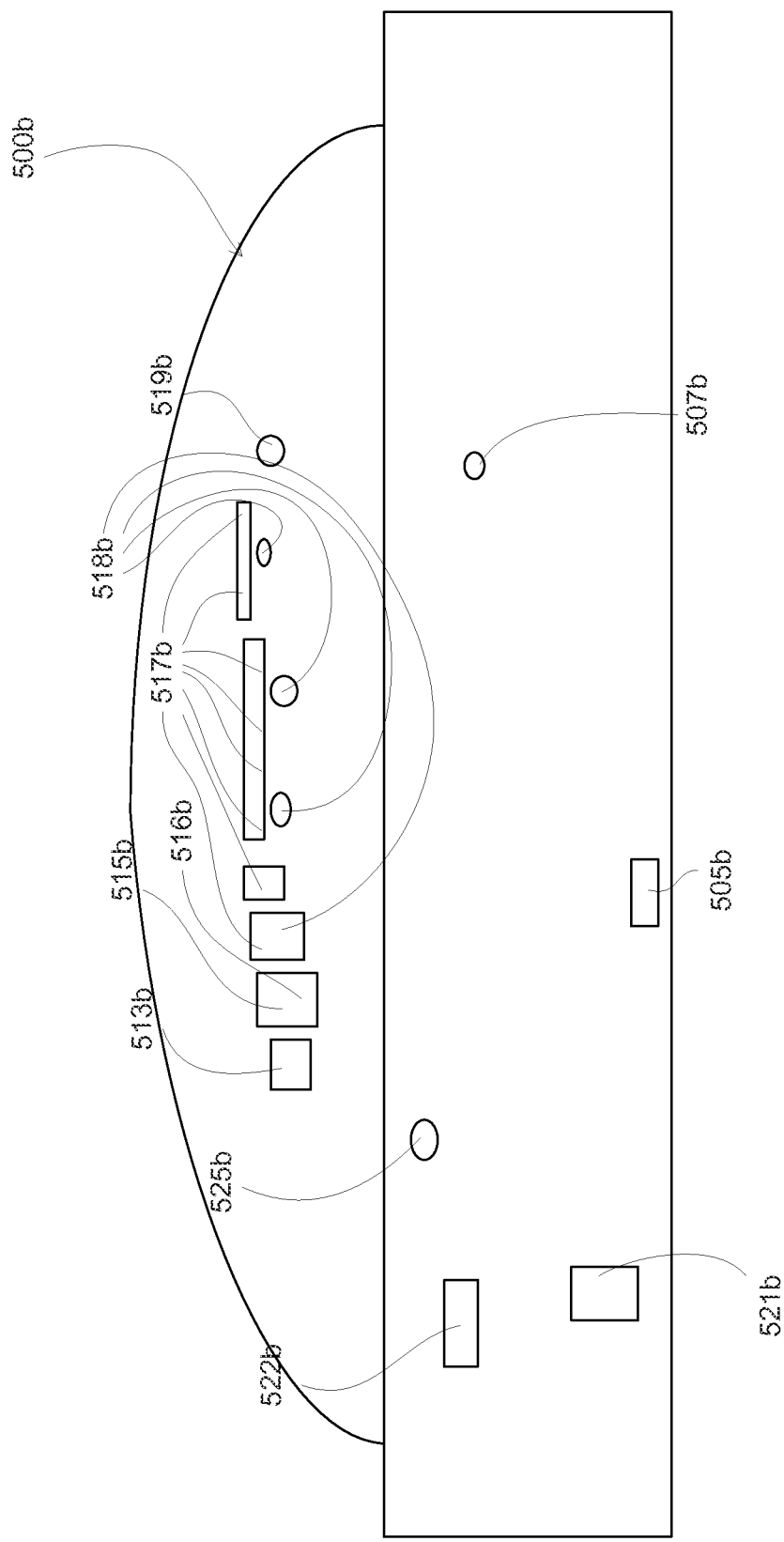

Turning to FIGS. 5a and 5b, an embodiment of an automatic vehicle equipment control system assembly 500a, 500b is depicted to include a mother board 505a, 505b, an imager board male receptacle connector 506a, a vehicle equipment male receptacle connector 507a, 507b, a processor 508a, an enhanced transceiver 509a, a vehicle bus communication chip 510a, an ambient light sensor 511a, a glare light sensor board 512a, a glare light sensor 513b, compass sensors 514a, a first indicator 515, a second indicator 516, operator interface contacts 517, operator interface indicators 518 and third indicator 519.

The mother board is connected to a daughter board 520a, 520b via a mother board/daughter board interconnection 525a, 525b. The daughter board comprises an information display driver 522b and an information display 521b. As can be seen, the glare sensor board and the daughter board have at least one component that is oriented such that it faces an opposite direction from the components mounted directly to the mother board. It should be understood that the components of the glare sensor board and the daughter board may be mounted directly to the mother board on an opposite side from other mother board components. The configuration depicted in FIGS. 5a and 5b is preferred for manufacturing processes related to this embodiment. It should be understood that the daughter board may be connected to the mother board similar to the imager board connection, via a radio frequency wireless interconnection, a fiber optic interconnection, a vehicle bus interconnection, a light ray interconnection or a combination thereof. The hard wire interconnection may be via a substantially flat, ribbon type, configuration; cables with individually shield twisted pairs; multiple individual cables or non-shielded conductors.

The mother board is also connected to an imager board 535a via a mother board/imager board interconnection 545a. The imager board comprises a mother board male receptacle connector 536a, an imager 537a, a lens cover 538a, a data LVDS 539a, a clock LVDS 540a, and lenses 541a. The interconnection 545a comprises an imager board female plug connector 547a, a mother board female plug connector 546a having a mechanical clip for snap interlock with the mating mother board male receptacle connector 506a and a ground connector 548a. It should be understood that said imager board may comprise an imager board heater (not shown) configured to maintain the temperature of the imager board above ambient. This configuration is beneficial to inhibit condensation and the like from forming on an imager. It should be understood that the imager board heating may be on continuously or may be configured to be automatically controlled; for example, the temperature sensor on board the imager may be configured to operate an on board output such that no additional lines from a mother board to the imager board are required.

Figure 6B:
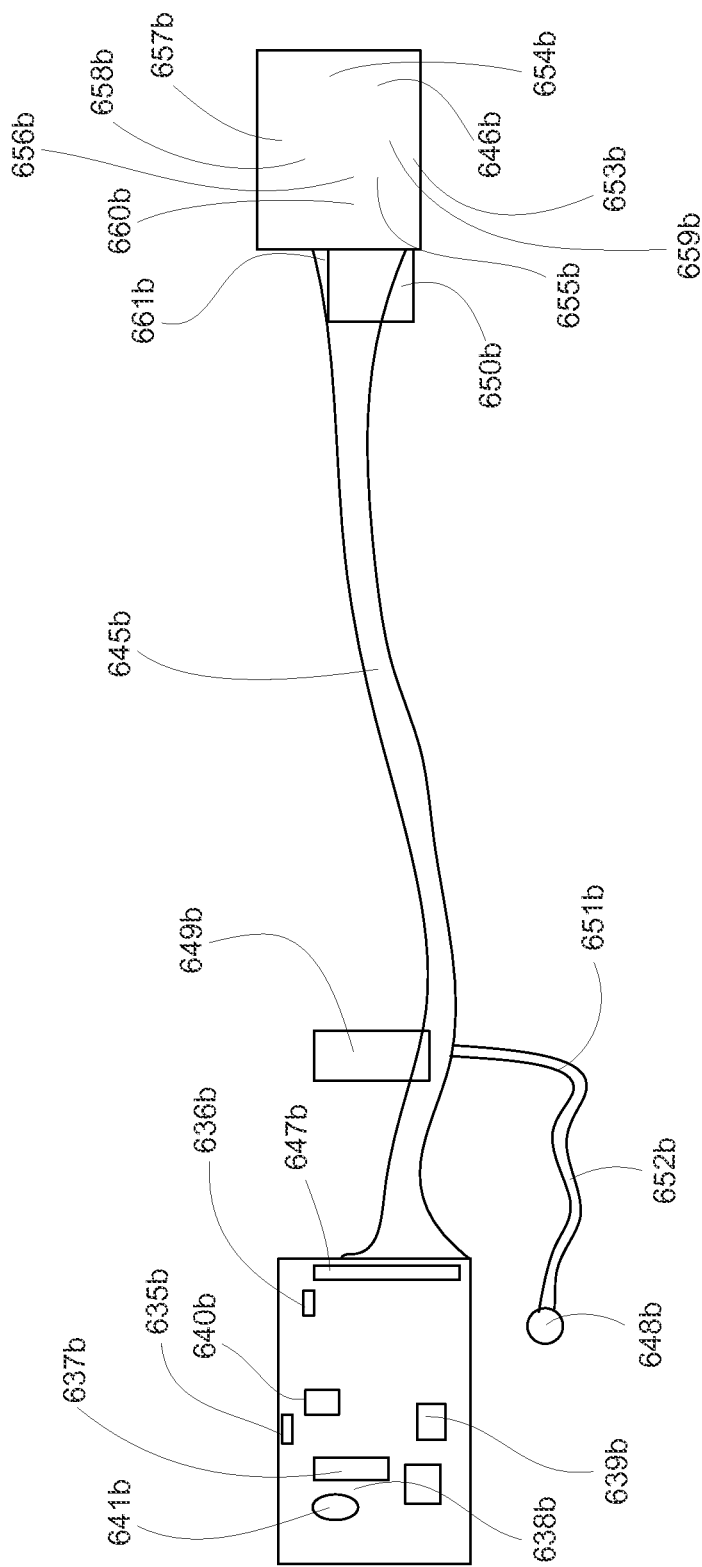
FIG. 6b depicts a second view of the imager board and interconnecting cable of FIG. 6a with typically enclosed, non-visible, portions of the interconnecting cable exposed.

Turning now to FIGS. 6a and 6b, there are shown two embodiments of imager boards as elements 635a, 635b with mother board/imager board interconnections 645a, 645b. The imager board 635a is similar to imager board 635b aside from the fact that the data and clock LVDSs are integrated into the imager 637a. In preferred embodiments, the imager may have at least one of: an image sensor logic and control circuit; an analog-to-digital converter; a temperature sensor; an LVDS; a voltage regulator; a control output integrated on a common wafer with an image sensor. The mother board/imager board interconnection comprises a mother board female plug connector 646a, 646b with a mechanical clip 654b, an imager board female plug connector 647a, 647b, a first boot 650a, 650b, a second boot 661a, a jacket 661b, a foil shield 649b, a ground connector 648a, 648b, a ground conductor 651b, a first ground insulation 652b, a second ground insulation 653b, a positive conductor 655b, a reference conductor 656b, a second ground conductor 657b, a first twisted pair 658b, a second twisted pair 659b and a NSS conductor 660b. It should be understood that the imager board may be connected to the mother board similar to the daughter board connection, via a radio frequency wireless interconnection, a fiber optic interconnection, a vehicle bus interconnection, a light ray interconnection or a combination thereof. A hardware interconnection may be via a substantially flat, ribbon type, configuration; cables with individually shield twisted pairs; multiple individual cables or non-shielded conductors depending on the length, whether or not the conductors are within a "through the ball" configuration.

Figure 7A:
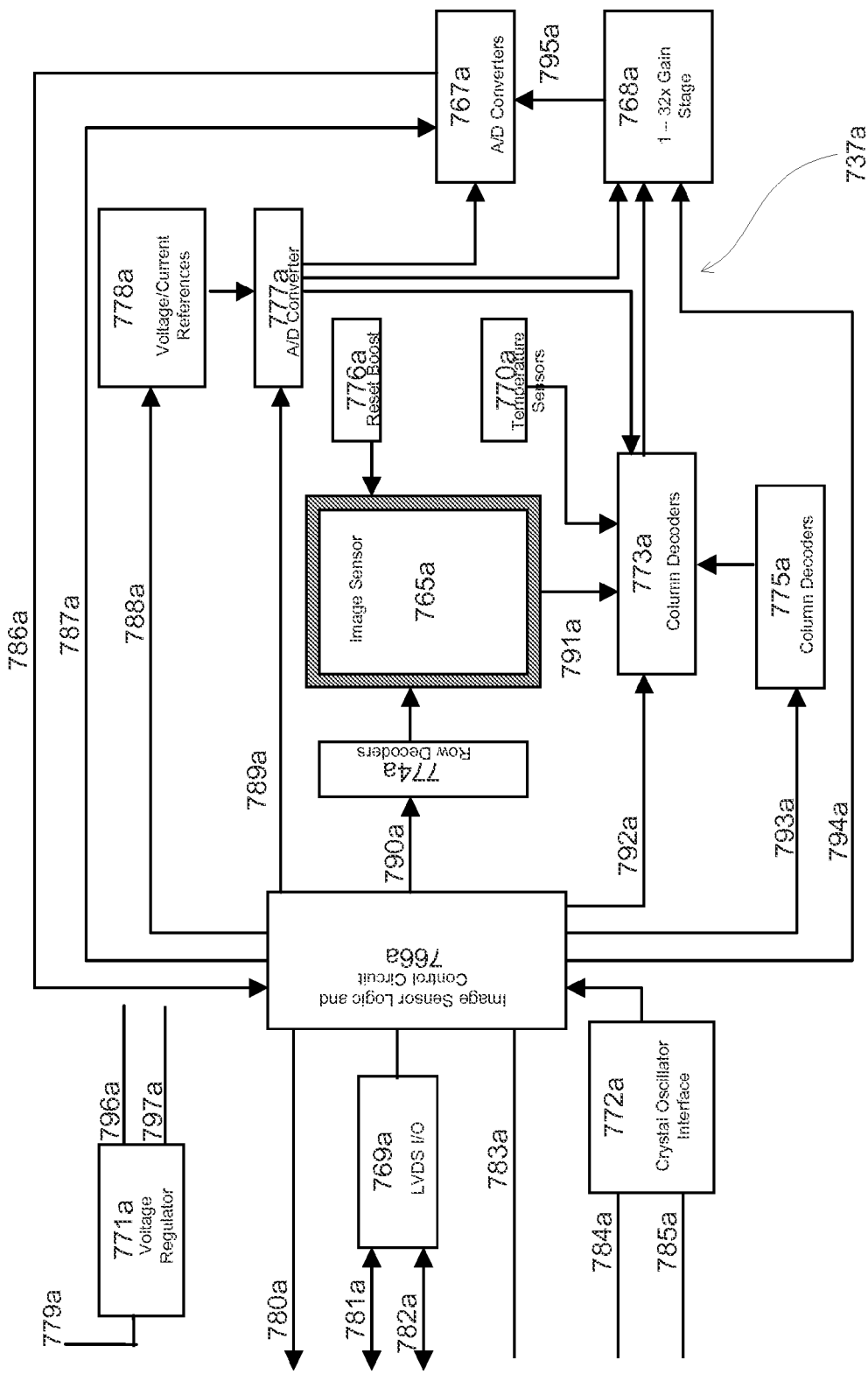
FIG. 7a depicts a block diagram of an embodiment of an imager.
Figure 7B:
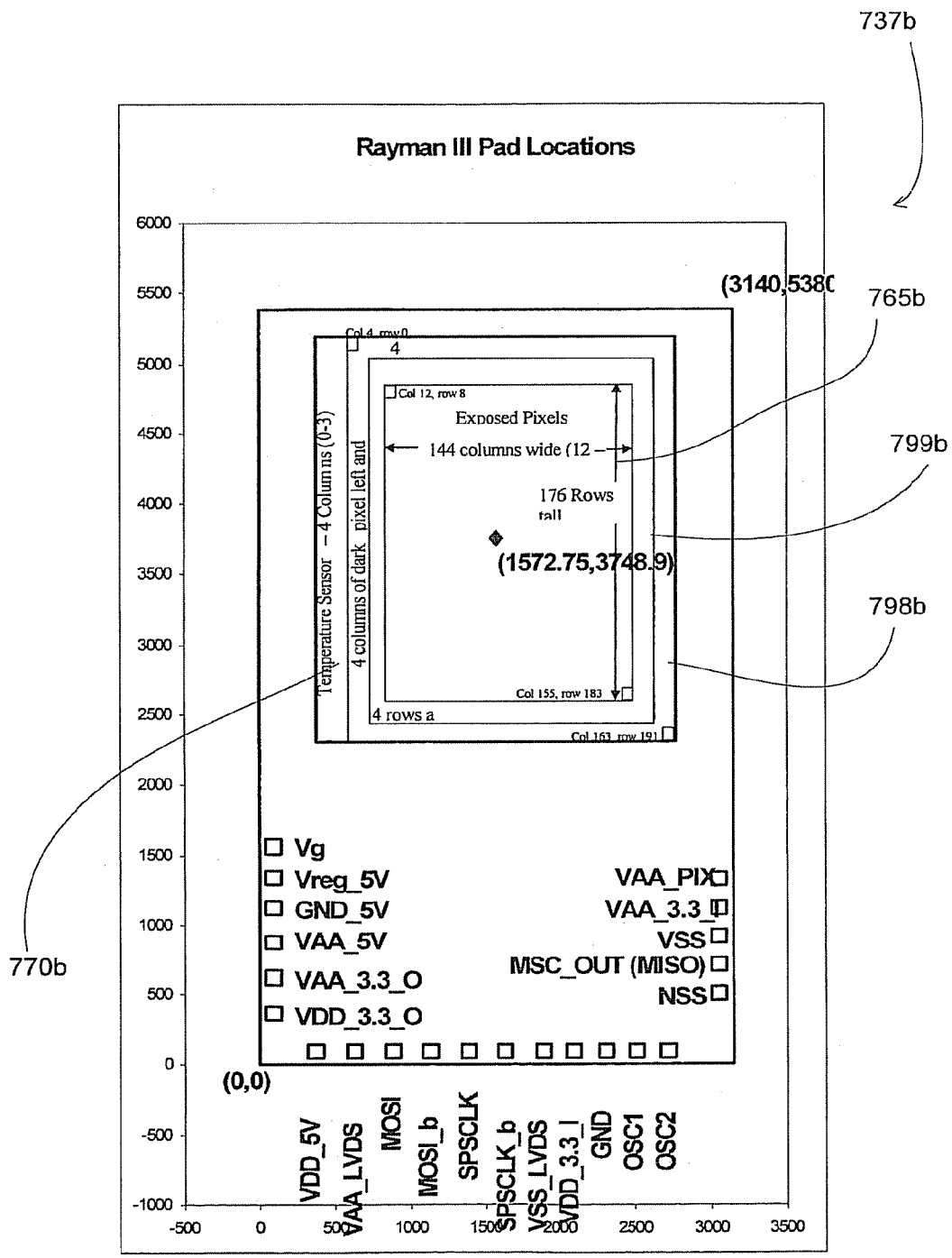
FIG. 7b depicts an embodiment of an image sensor and temperature sensor.

With reference to FIGS. 7a and 7b, an imager 737a, 737b is depicted to comprise: an image sensor 765a, 765b; temperature sensors 770a, 770b; dark pixels 798b; guard pixels 799b; image sensor logic and control circuit 766a; a pipelined analog-to-digital converter 767a; a 1-32× gain stage 768a; LVDS I/O 769a; voltage regulators 771a; a crystal oscillator interface 772a; analog column 773a; row decoders 774a; column decoders 775a; a reset boost 776a; digital-to-analog converters 777a; voltage/current references 778a; a 5V $V_{DD}$ connection 779a; a MISO (for test) connection 780a; a MOSI connection 781a; an SPSCLK connection 782a; an NSS connection 783a; an OSC+ connection 784a; an OSC− connection 785a; a data out line 786a; control signals 787a for pipelined analog-to-digital converter 767a; control signals for biases 788a; power down 788a; control signals 789a for digital-to-analog converters 777a; a row number line 790a; a raw analog line 791a; control signals 792a; a column number line 793a; a gain control line 794a; amplified signals 795a; a 3.3V $V_{DD}$ line 796a and a 3.3V $V_{AA}$ line 797a.

Figure 7C:
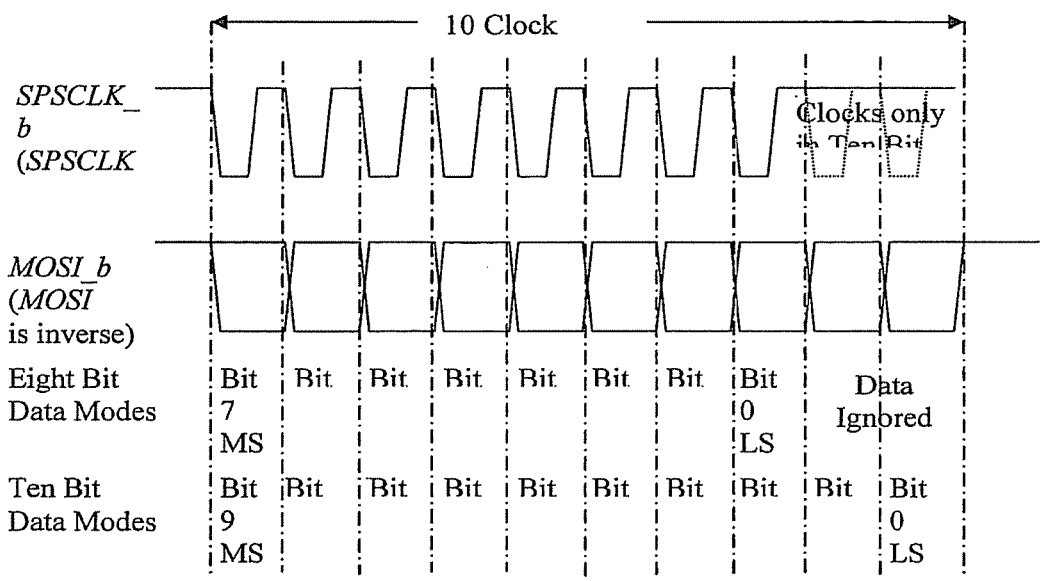
FIG. 7c depicts imager related signal waveforms.
Figure 7D:
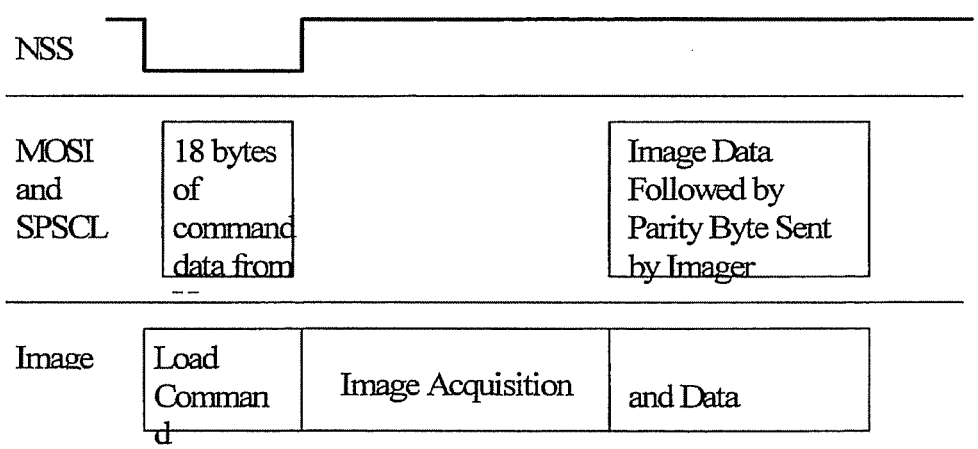
FIG. 7d depicts an imager command/response sequence.
Figure 7E:
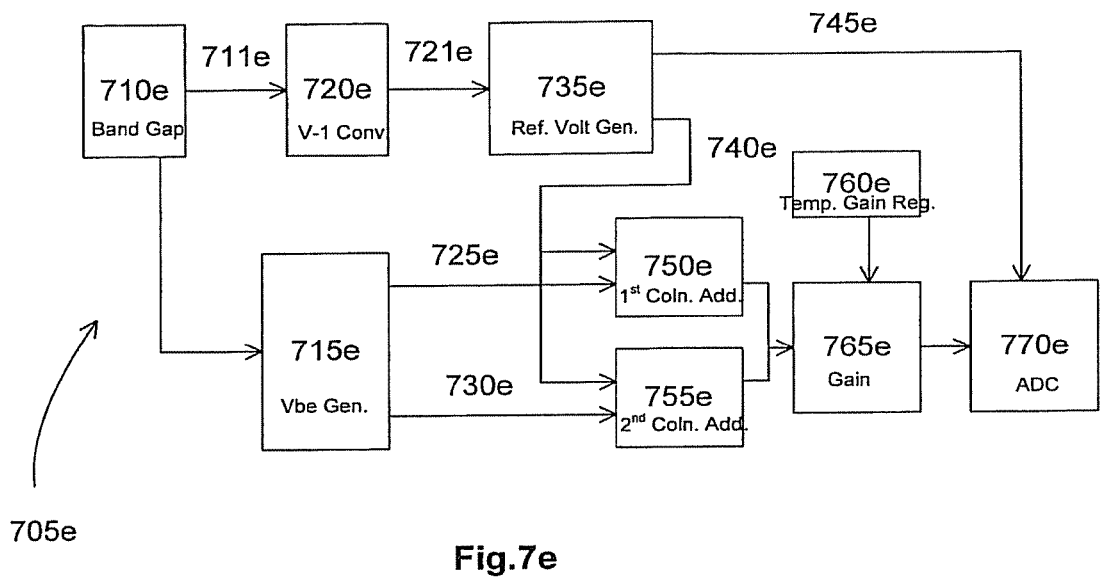
FIGS. 7e and 7f depict a temperature sensor.
Figure 7F:
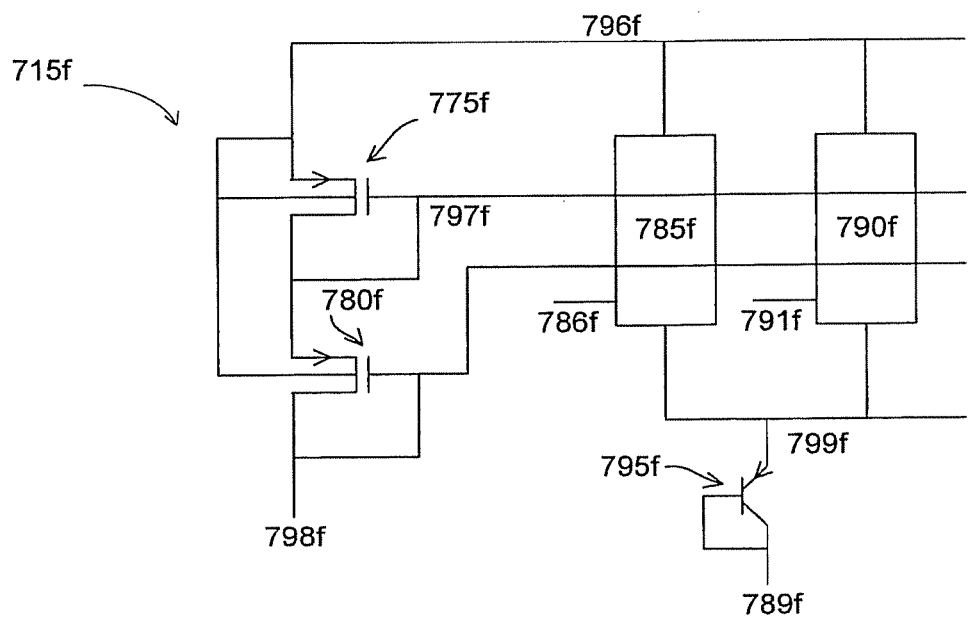

Turning to FIGS. 7e and 7f, there is shown a block diagram 705e and a VBE generator 715e, 715f. Preferably, the temperature sensors are incorporated into the imager as described herein. Preferably, the temperature sensor comprises a bandgap 710e, a $V_{BG}$ line, a V-I converter 720e, an $I_{REF}$ line 721e, a $V_{BE2}$ line 725e, a $V_{BE1}$ line 730e, a reference voltage generator 735e, a $V_{REF}$ line 740e, a $V_{REFADC}$ line 745e, a first column address 750e, a second column address 755e, a temperature gain register 760e, a gain 765e and an ADC 770e. The VBE generator comprises a first transistor 775f, a second transistor 780f, a third transistor 795f and PNP structures 785f, 790f. The current through PNP structure 790f is a multiple of the current through 790f, for example, a factor of 64. The difference in the VBE between 785f and 790f is a function of the temperature. The VBE generator further comprises a Vaa connection 796f, a vb2 connection 797f, an irefT connection 798f, an AGND connection 789f, a sampb_vbe1 connection 786f and a sampb_vbe2 connection 791f. The analog gain 765e and ADC 770e are preferably the same devices as 768a and 767a, respectively. Therefore, the temperature sensor values are read out identical to pixel values.

Following is a detail description of a preferred embodiment of an imager. As described, the imager incorporates a image sensor, temperature sensors, dark pixels, guard pixels, an image sensor logic and control circuit, voltage regulators, LVDSs, analog-to-digital converters, loop back testing features and a control output. The control output is particularly useful for moisture sensor applications incorporating supplemental illumination.

Example Imager

This document describes an imager designed to meet the requirements of automotive locations. The image sensor provides 144 columns and 176 rows of photodiode based pixels. Control and data signals are communicated over a Low Voltage Differential Signaling Serial Peripheral Interface (LVDS SPI) connection to a processor. The imager also has provisions for sensing temperature, controlling one output signal, providing voltage regulation to internal components, and some device testing.

Commands provide control of a variety of exposure, mode, and analog settings. The imager is capable of taking two images simultaneously from different starting rows, a feature that permits highly synchronized images in a dual lens system. In this mode each image can have an independent gain setting. Another option allows the gains to be applied in a checkerboard image for applications where a spectral filter is applied to the image sensor in a checkerboard pattern. The imager also transmits a parity byte with the output data so the processor can verify the reception of the proper data. Data can be transmitted in ten bit mode, a compressed eight bit mode where a ten bit value is represented in eight bits, or a truncated eight bit mode where only the most significant eight bits of each ten bit pixel is transmitted. Table 1 depicts a series of specifications for the imager of this example.

TABLE 1

| Parameter | Value |
| --- | --- |
| Resolution | 176 × 144 |
| Pixel Size | 15 µm × 15 µm |
| Pixel Type | Photodiode |
| Sensitivity | 7 V/lux-sec |
| Fill Factor | >70% |
| ADC Resolution | 10-bits |
| ADC Conversion Rate | >1 Msamples/sec |
| ADC References | Programmable |
| Analog Gain | 1-32 Programmable |
| Differential Output | RS-644 |
| I/O Pad Size | 100 µm × 100 µm |
| Clock Input | <=10 MHz |
| ESD Protection | >2 Kv |
| Supply Voltage | 5.0 + 0.4 v/−0.5 v |
| Voltage Regulator | 3.3 V |
| Maximum Data Rate | 10 Mbits/s, 1 MBytes/sec (eight bit mode) |
| Operating Temperature | −40 C. to +85 C. |
| Storage Temperature | −40 C. to +125 C. |
| Data Stream Error Detection | Parity Byte |
| Communication Format | up to 10 MBit/Sec - SPI Master/Slave |
| Pixel Data Format | selectable - 10 bit, 8-bit compressed or truncated |

Table 2 contains a description for the acronyms shown near various imager connections in FIG. 7b.

TABLE 2

| SECTION | NAME | SIG TYPE | DESCRIPTION | DIR | PAD # |
| --- | --- | --- | --- | --- | --- |
| Oscillator | OSC1 | Crystal Osc | Master Clock or crystal pin 1 | In | 16 |
| | OSC2 | | crystal oscillator pin 2 | Out | 17 |

TABLE 2-continued

| SECTION | NAME | SIG TYPE | DESCRIPTION | DIR | PAD # |
|---|---|---|---|---|---|
| LVDS I/O | VAA_LVDS | Power | 3.3 V power supply for LVDS | In | 8 |
| | VSS_LVDS | GND | Ground for LVDS | In | 13 |
| | MOSI | LVDS | Serial Data In/Out (Differential) Note that the MOSI_b signal is the positive signal with the MOSI signal is the inverted level. | I/O | 9, 10 |
| | SPSCLK | LVDS | Serial Data Clock (Differential) Note that the SPSCLK_b signal is the positive signal with the SPSCLK signal is the inverted level. | I/O | 11, 12 |
| Control Test | NSS | CMOS | Data transfer direction bit | In | 18 |
| | MISO/ MSC_OUT | CMOS | Output signal for testing or illumination control. Can be set steady state, to toggle during integration, or output residual data. | Out | 19 |
| | VAA_PIX | Power | Analog input to ADC in test mode. When not used for testing, this pin must be connected to 3.3 V. | In | 22 |
| Regulator | Vreg_5V | Power | 5 V input supply for regulator | In | 2 |
| | VAA_5V | Power | 5 V input supply for analog 3.3 V supply | In | 7 |
| | VDD_5V | Power | 5 V input supply for digital 3.3 V supply | In | 5 |
| | GND_5V | GND | Ground for 5 V regulator supply | In | 3 |
| | VDD_3.3_O | Power | Digital regulated 3.3 V supply output | Out | 4 |
| | VAA_3.3_O | Power | Analog regulated 3.3 V supply output | Out | 6 |
| | VG | Analog | Voltage regulator bias voltage out for decoupling. Requires a cap to ground. | Out | 1 |
| Power | VDD_3.3_I | Power | Digital regulated 3.3 V supply input | In | 14 |
| | GND | GND | Ground for VDD_3.3 | In | 15 |
| | VAA_3.3_I | Power | Analog regulated 3.3 V supply input | In | 21 |
| | VSS | GND | Ground for VAA_3.3 | In | 20 |

Table 3 provides detail of various imager electrical power connections.

TABLE 3

| Regulator Power: | The following signals must be connected to a 4.5 to 5.4 volt supply to operate the chip: VREG_5V, VDD_5V (when using VDD_3.3_O), and VAA_5V (when using VAA_3.3_O). The corresponding ground is GND_5V. The Pin VG must be connected to a TBD capacitor for the charge pump to operate properly. |
|---|---|
| LVDS Power: | The signals VAA_LVDS must be connected to a 3.3 ± TBD volt supply to operate the chip. The signal VSS_LVDS is the LVDS ground. |
| Analog Power: | The signals VAA_3.3_I must be connected to the VAA_3.3_O or other 3.3 ± TBD volt supply to operate the chip. The signal VSS_3.3 is the analog ground. |
| Digital Power: | The signals VDD_3.3_I must be connected to the VDD_3.3_O or other 3.3 ± TBD volt supply to operate the chip. The signal GND is the digital ground. |
| Pixel Power | The signals VAA_PIX must be connected to the VAA_3.3_O or other 3.3 ± TBD volt supply to operate the chip when not in ADC test Mode (See below). |

Table 4 provides detail of various imager operational connections.

TABLE 4

| NSS: | Serial data direction input. 0 = write to sensor, 1 = read from sensor. The NSS signal needs to be asserted low for at least 6 oscillator cycles (0.6 μ seconds with a 10 MHz clock) before starting the command transmission. NSS must be held low for at least 10 oscillator cycles (1 μ second at 10 MHz) after transmission completes. |
|---|---|

TABLE 4-continued

| | |
|---|---|
| SPSCLK | Bi-directional LVDS serial clock (direction determined by NSS), where data is clocked (valid) on rising edge for input and output. The SPSCLK signal must be set high before each transition of NSS and must remain high for at least 6 camera oscillator cycles after the transition. (0.6 μ seconds at 10 MHz). |
| MSC_OUT (MISO): | Miscellaneous output pin. Can be toggled during integration time or set to a specified level, also can send the residual registers from a previous image while sending an image command. Refer to the command bits tst, oba, and obb in byte 0 of the command string. |
| MOSI: | Bi-directional LVDS serial data (directed determined by NSS). Data is sent most significant bit first. |

Table 5 provides detail of various imager test connections.

TABLE 5

| | |
|---|---|
| VAA_PIX: | This pin can be used to input a voltage directly into the ADC during testing when ADCtest (bit 5 of byte 3) of the command sequence is set. When this bit is not set this pin must be connected to 3.3 volts. |

The imager is controlled by an 18 byte serial command described herein with reference to Table 6. These commands are sent from the processor with the NSS line held low. The imager then gathers the requested image and sends the resulting pixel data followed by a parity byte.

TABLE 6

Command Summary

| Name | bit 7 | bit 6 | bit 5 | bit 4 | bit 3 | bit 2 | bit 1 | bit 0 |
|---|---|---|---|---|---|---|---|---|
| Control | tst | ckbd | tbo | cbo | obb | oba | rsh | sfm |
| idac_iadc_Id | | | | idac_iadc_Id | | | | |
| idac_ibias_Id | | Unused | | | idac_ibias_Id | | | |
| voffset_Id | psfd 1 | psfd 0 | adctest | | Voffse_Idt | | | |
| Vreflo | ffs | irr | iad | cont | Vreflo_Id | | | |
| Gain 1 | | | | | Gain 1 | | | |
| Gain 2 | | | | | Gain 2 | | | |
| NumFrames | Number of Frames (ones compliment/twos compliment if start row = last row) | | | | | | | |
| NumIntegrationFrames | Number of Integration Frames (ones compliment) | | | | | | | |
| LastRow | Last Row of Image | | | | | | | |
| StartRow | Row Read Counter Start Value (Integration Rows = LastRow-StartRow) | | | | | | | |
| FirstRow | First Row of Image | | | | | | | |
| RowOffset | Row Offset of Second Frame from First Frame | | | | | | | |
| LastColumn | Last Column Scanned | | | | | | | |
| ResetColumn | Column Read Counter StartValue (Int. Pixels = LastColumn-ResetColumn) | | | | | | | |
| LastReadColumn | Last Column of Image | | | | | | | |
| FirstColumn | First Column of Image | | | | | | | |
| ColumnOffset | Column Offset of Second Frame | | | | | | | |

The imager can be operated with either an up to 10 MHz oscillator connected to OSC1, or an appropriate resonator circuit connected across OSC1 and OSC2 as shown in the FIGS. FIG. 7c depicts the imager serial peripheral interface data timing. FIG. 7d depicts the imager command and data sequence and timing.

With reference to Tables 7-11, each bit (bits 0-7) of each byte (bytes 0-17) of the 18 byte serial imager command set is described.

Byte 0: Control Byte

TABLE 7

| bit 7 | bit 6 | bit 5 | bit 4 | bit 3 | bit 2 | bit 1 | bit 0 |
|---|---|---|---|---|---|---|---|
| tst | ckbd | tbo | Cbo | Obb | Oba | rsh | sfm |

Description:
Used to set control bits for test modes, gain control pattern, output format, integration time, and dual frame mode.

tst: Test. Causes the residue from the previous instruction to be sent on the spcl_pin_out as the current instruction is received. The residue contains the values of the command stream including the revised frame, row and column counters after an image is taken.

ckbd: "Checkerboard pattern." Causes the pixel gain to be set to gain_1 when the exclusive or of the least significant bits of the pixel's row and column address is 0 and to gain_2 when it is 1. When ckbd is not set, gain_1 is used on the first frame and gain_2 on the second frame. (When sfm (second frame only) is set and ckbd is 0, gain_2 is used.)

tbo: Ten bit output mode—Causes all 10 bits of the a/d output to be sent, if cbo is also set, the high 8 bits are the compressed value. When tbo is not set, the high 8 bits, only, are transmitted. Note that each byte takes ten imager clock cycles and the data lines will always be set to bits 1 and 0 of the ADC value during the last two imager clock cycles of the byte transmission period, regardless of the tbo or cbo values. Only eight SPSCLK clock cycles will be sent in the eight bit modes, with the clock line idle for the last two bit times of a pixel. In 10 bit output mode, the 10 SPSCLK clock cycles will be issued per pixel.

cbo: Compressed bit output mode—causes the 10 bit to 8 bit log based compression to compress the ten bit a/d output into 8 bits which are transmitted on the high 8 bits of the output.

obb Output bit control "b"—Causes MSC_OUT pin (referred to as the MISO pin in some documentation) to switch to its compliment state during sensor integration periods and causes no response when it is not set.

oba: Output bit control "a"—sets the MSC_OUT pin (referred to as the MISO pin in some documentation) to default to 1 if it is 1 and to 0 otherwise.

rsh: Row Shift—Causes the number of integration rows in a dual frame mode to be reduced by one—to an odd number. This has the effect to move the integration time to the next lower row and to allow the integration time to be advanced by single row increments. Before, because of the dual row processing in the dual frame mode, the integration time could only be increased in double row increments and the partial row setting could only cover a major portion of one of those two rows leaving a one row time gap in the integration time setting capability. Rsh must be 0 when the integration time is less than 1 row (StartRow=LastRow) and when the sfm (second frame only) is set.

sfm: Single frame mode—sets the mode to single frame (second frame only). This results in a single integration frame with row offsets and gain_2 applied as for the second frame in dual frame mode.

Byte 1: idac_iadc_ld

TABLE 8

| bit 7 | bit 6 | bit 5 | Bit 4 | bit 3 | bit 2 | bit 1 | bit 0 |
| --- | --- | --- | --- | --- | --- | --- | --- |
| iadc 7 | iadc 6 | iadc 5 | iadc 4 | iadc 3 | iadc 2 | iadc 1 | iadc 0 |

Description:

Current reference setting for the Imager ADC. Recommended default is 48 (0x30).

Byte 2: idac_ibias_ld

TABLE 9

| bit 7 | bit 6 | bit 5 | Bit 4 | bit 3 | bit 2 | bit 1 | bit 0 |
| --- | --- | --- | --- | --- | --- | --- | --- |
| unused | unused | Bias 5 | Bias 4 | Bias 3 | Bias 2 | Bias 1 | Bias 0 |

Description:

Current Bias setting for the ADC. Recommended default is 14 (0x0e).

Byte 3: voffset_ld

TABLE 10

| bit 7 | bit 6 | bit 5 | Bit 4 | bit 3 | bit 2 | bit 1 | bit 0 |
| --- | --- | --- | --- | --- | --- | --- | --- |
| psfd 1 | psfd 0 | adctest | offset 4 | offset 3 | offset 2 | offset 1 | offset 0 |

Description:

pfsd 1: Power supply frequency divider bit 1. This enables quieting the power supply during critical row sampling operation.

'0'—normal

'1'—regulator clk stopped during row_enable (experimental)

pfsd 0: Select frequency of power regulator charge pump. This should be set to provide least RF interference. The oscillator divisor should be set so that the charge pump operates at approximately 2.5 MHz. (Set this bit when using a 5 MHz resonator, clear it when using 10 MHz.)

'0'—main clock divided by 4 for regulator

'1'—main clock divided by 2 for regulator adctest: Analog Digital Converter Test—Setting this bit causes the Pixel data to be replaced with the voltage input on VAA_PXL as the input to the input to the ADC for testing.

voffset: Voltage Offset—This is the Voltage Offset for the DAC. Recommended default is 16 (0x10). Scaling for this value is 4 mV/bit, with a value of 16 corresponding to 0V.

Byte 4: Frame Control, Vreflo

TABLE 11

| bit 7 | bit 6 | bit 5 | Bit 4 | bit 3 | Bit 2 | bit 1 | bit 0 |
| --- | --- | --- | --- | --- | --- | --- | --- |
| ffs | irr | iad | cont | Vreflo 3 | Vreflo 2 | Vreflo 1 | Vreflo 0 |

Description:

ffs: First frame single—causes 0 additional integration frames to be added on the first frame, the number of added integration frames set minus one on the second frame, and the full number of added integration frames set for all frames after the first two irr: image row reset—causes the frame to be reset without reading, essentially starting a long integration.

iad: image A/D—causes the frame to be read without resetting first, ending a long integration.

cont Continuous—Continuously take images and send data.

Vreflo Voltage Reference Low—ADC Low Voltage Reference—recommended default is 6.

Byte 5: Gain_1

This gain is for the first half of an image or the even pixels of a checkerboard image. Gains are scaled as ⅛ of an F-Stop per bit. (8=gain of 1)

Byte 6: Gain 2

This gain is for the second half of an image or the odd pixels of a checkerboard image. Gains are scaled at ⅛ of an F-Stop per bit. This gain is used in Single Frame Mode.

Byte 7: NumFrames

The binary or ones compliment of the number of requested image frames.

Notes:

This is a ones complement number so to read a single frame set F to 254 since the actual number of frames will be [255—NumFrames]. However, if the integration time is less than a row then NumFrames must be set to 255 for a single frame, 256—{desired number of frames} in the general case.

Byte 8: NumIntegrationFrames

The binary or ones compliment of the number of integration frames. The row/column counters are used to determine integration time as well as actual read/reset position. The integration frame counter allows additional full frames to be added to the integration time.

Notes:

This is a ones compliment number so to integrate over a single frame set NumIntegrationFrames to 254 since the actual number of integration frames will be 255—NumIntegrationFrames.

Byte 9: LastRow

Last row of first image window in absolute coordinates. Valid values are from 0 to 183. The number of rows in each image will be equal to [LastRow−FirstRow+1].

Byte 10: StartRow

Starting row count of read row in absolute coordinates. The implementation is such that there is both a read row and reset row counter. Once set, these counters stay separated by the specified amount since they are incremented in unison. The reset row always starts at row 0. Specifying a small number for SR and large number for LR would mean a large delta between reset and read and hence larger integration times. Valid values are from 0 to 183.

Notes:

StartRow=LastRow−{integration rows}. If StartRow=LastRow, then integration becomes pixel times only. Note also that in this case the NumFrames value must be adjusted. The value of StartRow must be greater than or equal to FirstRow, discussed next. When the rsh (row shift) bit is set the StartRow must be less than the LastRow.

Byte 11: FirstRow

First row of first window in absolute coordinates. Valid values are from 0 to 183.

Notes:

The value of FirstRow must be less than or equal to the value of LastRow.

Byte 12: RowOffset

Second window row offset relative to coordinates of first window. The first row to be read in the second window is determined by the sum of FirstRow and RowOffset.

Notes:

The value of RowOffset must be greater than the value of [LastRow−FirstRow] (may not overlap). The value of RowOffset must also be less than [184−LastRow] (Must fit on imager). This offset is also applied in single frame mode (sfm=1 in byte 0)

Byte 13: LastColumn

Last column of first window that is sequenced through in absolute coordinates. Note that this could be different than LastReadColumn. Valid values are from 0 to 255.

Notes:

If LastColumn is greater than LastReadColumn, then this will establish the time between rows. Best results are obtained by keeping LastColumn as close as possible to LastReadColumn. This value must be greater than LastReadColumn and it must be at least 3 greater than ResetColumn. LastColumn should typically be LastReadColumn+1.

Byte 14: ResetColumn

Reset column in absolute coordinates. This value establishes the sub row integration time of the image. ResetColumn=LastColumn−{integration pixel times} Valid values are from 0 to 252.

Notes:

The value of ResetColumn must be at least three less than LastColumn since reset occurs on ResetColumn+2.

Byte 15: LastReadColumn

Last read column of first window in absolute coordinates. This value sets the last column to actually read. This could be different than the last column cycled through. Valid values are from 1 to 254.

Notes:

The value of LastReadColumn must be greater than FirstColumn. See section 6.0 Known Issues about column data offset, which requires this value to be set one higher than otherwise expected.

Byte 16: FirstColumn

First column of first window in absolute coordinates. The column is both sequenced through and read. Valid values are from 0 to 252.

Notes:

The value of FirstColumn must be less than or equal to LastReadColumn.

Byte 17: ColumnOffset

Second window column offset relative to coordinates of first window. The first column to be read in the second window is determined by the sum of FirstColumn and ColumnOffset. Valid values are from 0 to 255.

Notes:

The offset is applied only when reading one frame, when SFM=0 (byte 0).

The exposure time is defined as the time from the reset of a pixel until the time that pixel is read out. To establish a desired exposure time for each pixel two sets of counters are used: one for resetting (starting exposure) and one for reading (ending exposure). Each set of counters contains a frame counter, and row counter, and a pixel (or column) counter. The pixel counter is incremented each pixel time (10 clock cycles) unless it is equal to the LastColumn value in which case it is set to the FirstColumn value. At this rollover point, the row counter gets incremented. If the row counter would increment past the LastRow value, it is set to the FirstRow value. The frame counter is incremented when the row counter equals the LastRow value. When it reaches zero the scan (either reset or read) is completed.

The sets are initialized differently: The reset counters getting set to 0xFF, FirstRow, First Column for the frame, row, and pixel counters. The read counters are set to the NumIntegrationFrames, StartRow, and ResetColumn respectively. Additional counters and logic handle the dual frame, row shift, multiple images, and other variations. As the read counters point to a pixel while the frame counter equals 0xFF, the data is transmitted to the host. Once all of the data is sent, the parity byte is sent.

The finest granularity of exposure time is the PixelTime. One PixelTime is one-tenth of the crystal frequency. 8 data bits+2 bits spacing. Every exposure setting has at least 2 PixelTime resulting in a 2 PixelTime step whenever crossing integration boundaries (ex. sub row time to row time). The following are the equations that govern the integration times for the single window mode.

cols=LastReadColumn−FirstColumn+1 rows=LastRow−FirstRow+1 intpix=LastColumn−ResetColumn introw=LastRow−StartRowCount intframe=255−NumIntFrames PixelTime=Clock Period*10(1 μs@10 MHz,2 μs@5 MHz)

RowTime=#cols+(LastColumn−LastReadColumn+4)

FrameTime=#rows*Rowtime

Exposure=PixelTime*[intpix+(RowTime*introw)+ (Frametime*intframe)]

In the dual window mode (when either RowOffset (byte 12), or ColumnOffset (byte 17) are non-zero), the following are the equations that govern the integration times.

cols=LastReadColumn−FirstColumn+1 rows=2*(LastRow−FirstRow+1)

intpix=LastColumn−ResetColumn introw=2*(LastRow−StartRowCount)−rsh intframe=255−NumIntFrames PixelTime=Clock Period*10(1 μs@10 MHz,2 μs@5 MHz)

RowTime=#cols+(LastColumn−LastReadColumn+4)

FrameTime=#rows*Rowtime

Exposure=PixelTime*[intpix+(RowTime*introw)+(Frametime*intframe)]

The sampling of a row of pixels takes place in four added pixel times beginning during the last scanned pixel time for the preceding row and extending for three more unaccounted for pixel times. Then there is one additional unaccounted for pixel time before the first pixel time during which the first pixel of the row is read into a pipeline a/d which takes 8 pixel times to present the finished reading. This is where the +4 in the above calculation of row time comes from. The last read column must be at least one less than the last scanned column. This may be increased to at least eight less than the last scanned column to assure that partially finished results are not sitting in the pipeline a/d during the four pixel read row period while the pipeline a/d is shut down. The row requires a processing time equal to the number of the last scanned column minus the number of the first scanned column+5. The reset processing requires two additional reset processing periods after the assigned reset column, the implication being that the pixel reset column must be at least three less than the last scanned column. The reset row periods do not interfere with the normal integration period or the read pixel operation which may be in progress. Due to the row sampling method used, the actual effective integration period extends approximately from the time the row is reset to the time of the first pixel of the row in which row is read.

A temperature reading can be obtained by reading the four columns 0 through 3. A difference between the second and fourth columns values (converted to 10 bits) multiplied by 0.367 and added to 113 yields the temperature in degrees Celsius. These values assume a gain of one and default or standard analog settings. In practice, many rows should be averaged together to more accurately derive temperature.

After transmitting the image data requested, a parity byte will be transmitted. This byte is the result of "Exclusive OR" of all of the data sent as part of the image with 30 (0x1E).

Figure 8A:
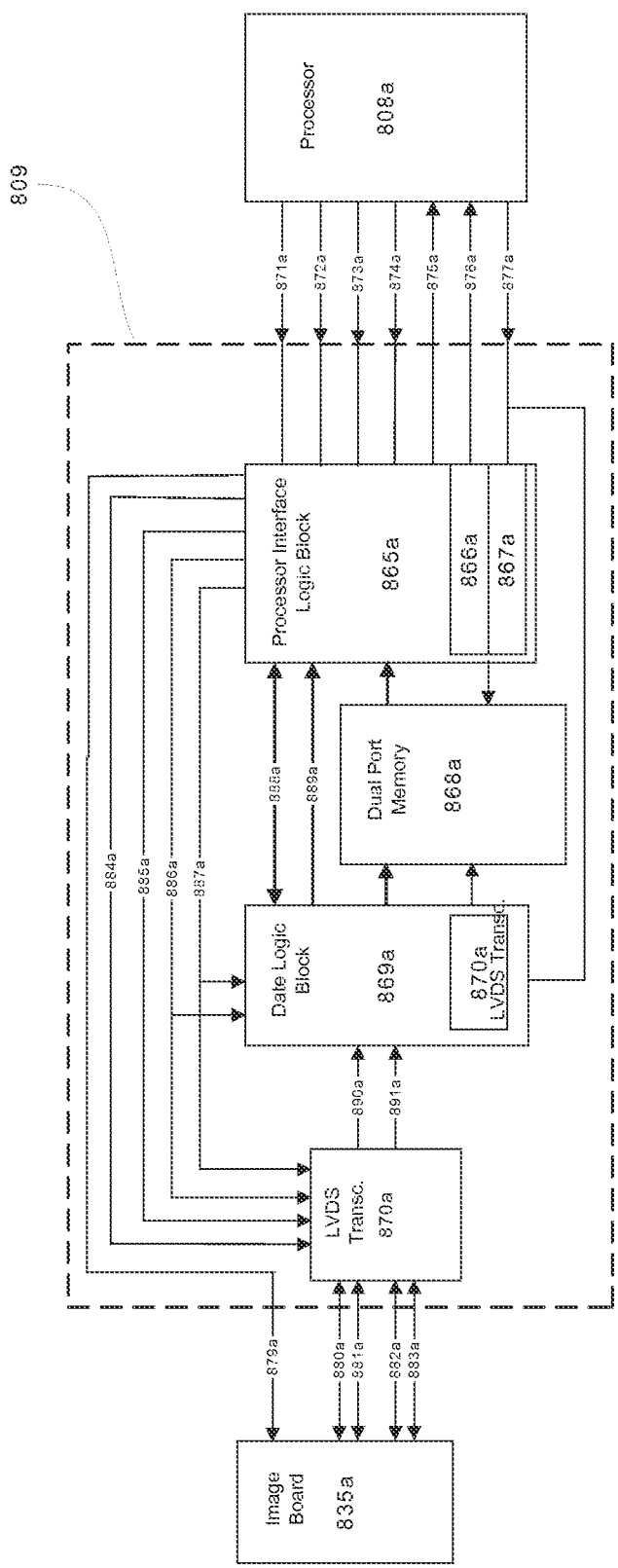
FIG. 8a depicts a block diagram of an embodiment of a low voltage differential signal device with memory.
Figure 8B:
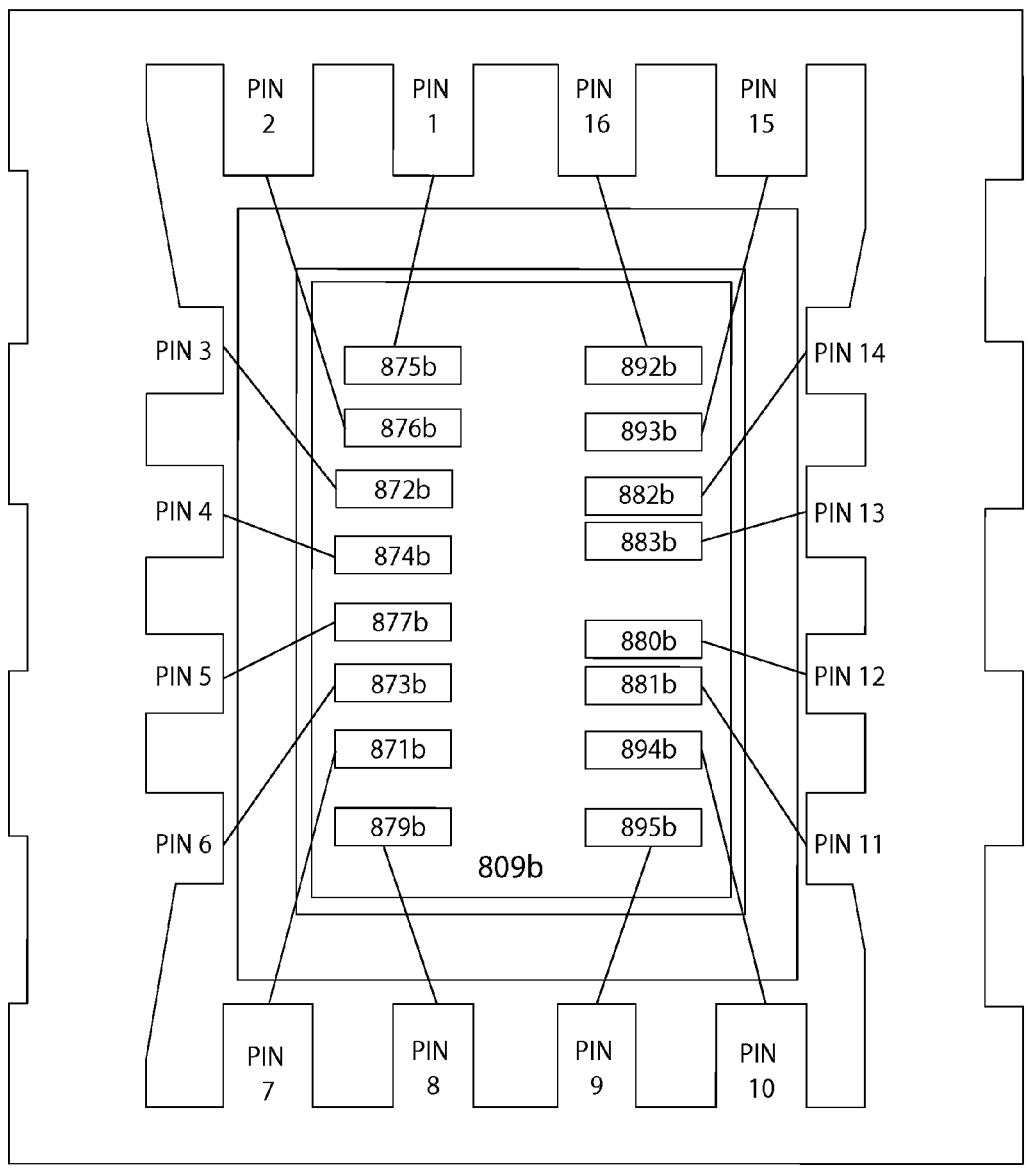
FIG. 8b depicts an exploded view of an embodiment of a silicon wafer comprising a low voltage differential signal device with memory, wire bonds and external connection pins.

Turning now to FIGS. 8a through 8c, an embodiment of an enhanced transceiver 809a, 809b, 809c is described with interconnection between an imager board 835a and a processor 808a. The chip is depicted as comprising: a processor interface logic block 865a; a first read address 866a; a second read address 867a; a 32,768 byte, 8-bit wide, dual port memory 868a; an incoming data logic block 869a having a write address; an LVDS transceiver 870a; a NSS connection 871a, 871b, 871c; a MOSI connection 872a, 872b, 872c; a NCMND connection 873a, 873b, 873c; a SPSCLK connection 874a, 874b, 874c; a MISO connection 875a, 875b, 875c; a READY connection 876a, 876b, 876c; a NRESET connection 877a, 877b, 877c; a SNSS connection 879a, 879b, 879c; a DATA+ connection 880a, 880b, 880c; a DATA− connection 881a, 881b, 881c; a DCLK+ connection 882a, 882b, 882c; a DCLK− connection 883a, 883b, 883c; a LVDS direction line 884a; a LVDS source select line 885a; a serial command data line 886a; a serial command clock line 887a; control signals 888a; register data 889a; an Imosi line 890a; an Ispclk line 891a; a 2.5 VDC connection 892b, 892c; a GND connection 893b, 893c; a $V_{AA}$_LVDS connection 894c and a $V_{SS}$_LVDS connection 895c. It should be understood that the SNSS connection 879a, 879b, 879c may not route through the enhanced transceiver, rather the SNSS connection is directly from a processor to an imager. In a preferred embodiment, the enhanced transceiver is configured to function somewhere between a truly random access memory and a first-in-first-out (FIFO) memory. For example, in a first frame single mode the enhanced transceiver provides the ability to create a synthetic high dynamic range image effect by making at least a portion of a first image and at least a portion of a second image available to a processor. Preferably, the imager only needs to receive one command instruction to transmit the two images. It should be understood that an enhanced transceiver and, or, imager may be configured to provide access to more than two different images. These features are useful when the associated vision system comprises algorithms that utilize pixels from more than one image such as in moisture detection systems that acquire at least one image without supplemental illumination and one with supplemental illumination. Exterior light control systems that acquire at least one image at a first integration period and at least one image at a second integration period. The successive images are acquired very close in time when no intervening command instruction is required. It should also be understood that a processor may be integrated along with the LVDS and memory of the enhance transceiver. Alternatively, image pre-processing features may be incorporated into the enhanced transceiver. For example, the enhanced transceiver may create a synthetic high dynamic range image, it may provide light source extraction functions, it may provide light source classification functions, subcombination thereof or combinations thereof. It is within the scope of the present invention to provide at least one imager, at least one enhanced transceiver, at least one processor, a subcombination thereof or combination thereof on a common board and, or, silicon wafer.

The following example describes a preferred embodiment of an enhanced transceiver.

Example Enhanced Transceiver

The ENHANCED TRANSCEIVER serves as a bi-directional Low Voltage Differential Signal (LVDS) transceiver for serial clock (SPSCLK) and data (MOSI) signals. The chip provides 32768 bytes of memory to buffer image data sent from the image sensor after image acquisition and to allow the processor to read this image data asynchronously. The chip provides a 5V tolerant interface with the processor. The chip provides memory access functions that facilitate dual image processing, result storage, and memory testing as described herein. The chip provides a parity calculation to verify proper transmission from an imager.

Table 12 depicts the enhanced transceiver operating modes along with status of related chip connections.

TABLE 12

Operating Modes

| Mode | NSS | NCMND | Loop Back | MOSI | MISO | DCLK and DDATA | SSNS |
|---|---|---|---|---|---|---|---|
| Imager Instruction | L | H | — | To LVDS to Imager | Inactive | From MOSI to Imager | L |
| Image Reception | H | H | 0 | Inactive | Read From Memory | From Imager To Memory | H |
| Loop back Mode | H | H | 1 | To Memory | Read From Memory | High Impedance | H |
| Status | H | L | — | Inactive | Register contents | From Imager to Memory | H |
| Command | L | L | — | To Registers then Memory | Inactive | High Impedance | H |

When transitioning between modes the lines should be switched in sequence to prevent accidentally entering Imager Instruction mode which will cause unwanted interference from the imager.

At the start of every image acquisition cycle, an 18 byte control instruction is sent from a processor to the imager. It should be understood that the enhanced transceiver is capable of transmitting other length control instructions, the imager of the example contained herein happens to utilize an 18 byte control instruction. The NSS (Not Slave Select) line is set low and the NCMND (Not Command) line is set high during this transmission. In this mode, the enhanced transceiver should serve only to convert the signals from the microcontroller to LVDS for transmission to the imager. The LVDS transceiver should be set to output data. The MOSI signal from the microcontroller is output on the DDATA+/DDATAI− LVDS pair. The SPSCLK from the microcontroller is output on the DCLK+/DCLK− pair. The imagers NSS line should be driven low in this mode. After the integration cycle is complete, the imager will transmit the acquired image over the MOSI & SPSCLK differential pairs to the enhanced transceiver. When NSS is high the LVDS transceiver is set to input data. The incoming data logic block should serve to receive the incoming serial data stream and store each byte to memory, incrementing the write memory location with each byte. See also the description of Loopback mode below. The processor is responsible for managing image requests and memory usage. Overflow conditions will cause loss of data.

When the loop back control bit is set and NSS and NCMND lines are high the serial data stream is sourced from the MOSI and SPSCLK lines from the processor rather than the LVDS transceiver.

The processor will read data from the enhanced transceiver memory asynchronously from data reception. The NSS and NCMND lines are set high in this mode. Data is read in a first-in-first-out (FIFO) order. The processor can monitor the READY signal to determine if there is data available. Note that the state of the ready line does not affect the operation of the reading. Independence from the ready logic permits using the memory as general purpose serial RAM with auto-incrementing pointers without regard to the ready logic. The processor receives the data by clocking the SPSCLK line, which clocks the data out serially on the MISO line. When the loop back control bit is set the data on the MOSI line is stored into the memory simultaneously using the same clock edges. Command bits can also be used to select which of two read pointers are used to access data.

When the NSS and NCMND lines are both low, the data sent from the processor is stored into a command register, the read and write pointer registers, and into memory. Details of the various command bits and command sequences are provided later in this document. No clock or data signals are sent out the LVDS lines in this mode, the LVDS lines are actively held idle (high) by the imager during this state.

When the NSS is high and NCMND line is low, the parity test bit and write pointer is latched and shifted out to the processor using the SPSCLK and MISO lines. Additional reads will transfer the values of Read Pointer 1, Read Pointer 2, command register, and parity register. The reception of data from the imager is not affected in this state. This combination should not be needed when the loop back bit is set. Requesting status in Loop Back mode is not defined.

A reset line is provided as an input to the enhanced transceiver. When reset is set low, the chip is set to an "empty" state (Write pointer to 7FFF hexadecimal, read pointers to 0. All internal registers and memory pointer counters should be initialized. Read Pointer 1 will be selected.

While operating in Image Reception and Status Modes, the Ready line will be set high when new data is written into the memory. It will be cleared when the last byte written is read by the processor. It also will be cleared when setting the alternate bit in the command register. When operating in the alternate read modes, care should be taken to set the read pointers so that the write pointer will not be incremented past a read pointer if the ready line is set.

When the Alternate bit is set in the command register, the data output during reading alternates which read pointer is used to read the memory. If the first byte if read using read pointer 1, the next byte will be read using pointer 2 and so on. This mode permits simultaneous processing of two images.

When the first byte of an imager command is sent, the parity register is set to 14 (0xe). Each byte received during Image Reception mode is then exclusive-ORed with the Parity Register. When the chip is set to Status mode, the first bit transmitted (MSB of the Write Pointer) will be set to one if the parity register is equal to zero.

The maximum instruction data clock rate is 10 MHz. The maximum image data reception clock rate is 10 MHz (1 μs/byte). The maximum processor data read clock rate is a function of the interconnection transmission capability, preferably greater than 12 MHz.

All data is sent most significant bit first. All data is clocked on the rising edge of the appropriate clock. MISO and MOSI data are clocked by the SPSCLK signal, while the LVDS DATA lines are clocked using the DCLK lines. All data is processed in bytes. Reception of partial bytes must be avoided. Pointer register values are transferred as two bytes with the first bit being don't care followed by the fifteen bit value, most significant bit first. The exception to this is the use of the first bit of the write pointer for the parity check function.

Figure 8D:
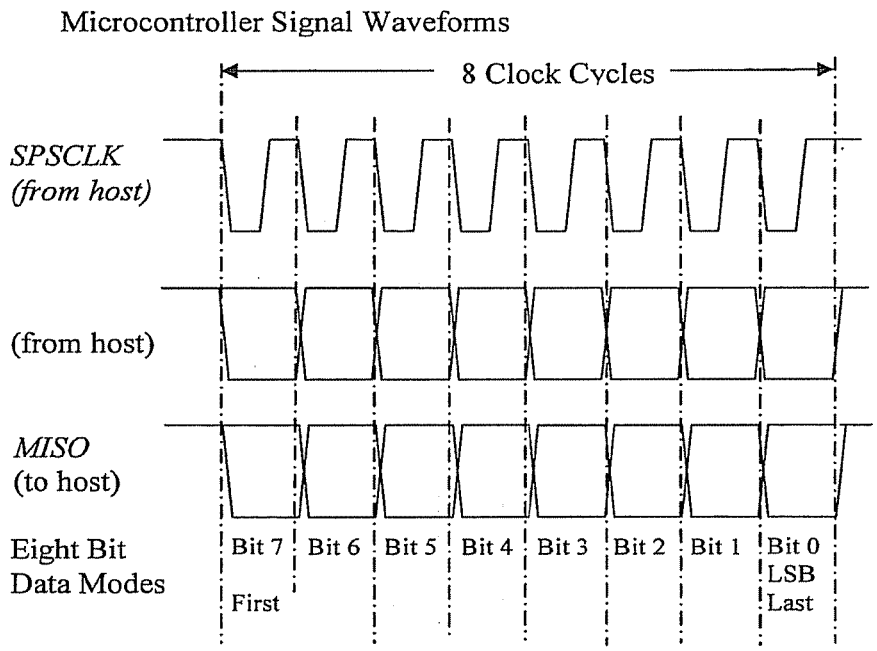
FIG. 8d depicts processor signal waveforms.
Figure 8E:
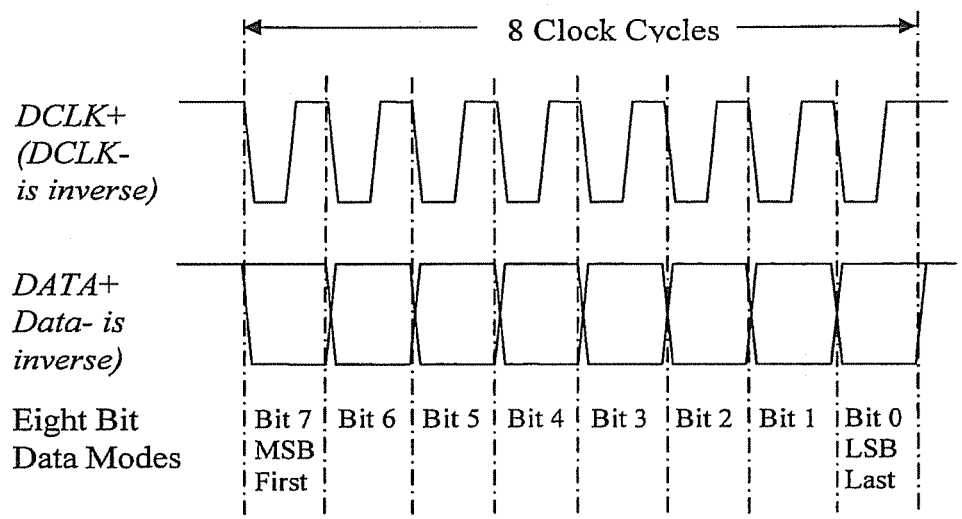
FIG. 8e depicts LVDS signal waveforms.

The enhanced transceiver may be configured to operate from a single 2.5 VDC supply. FIGS. 8*d* and 8*e* depict the associated processor signal waveforms and LVDS signal waveforms, respectively. The first byte received from the microcontroller after entering command mode is the command byte. If required, a value for the pointer register is received in the next two bytes. Any additional bytes sent while command mode is selected will be written to memory using the write pointer register. Tables 15 and 14 depict details of the associated enhanced transceiver command byte.

TABLE 13

| bit 7 | bit 6 | bit 5 | bit 4 | bit 3 | bit 2 | bit 1 | bit 0 |
|---|---|---|---|---|---|---|---|
| Loop back | Alternate | Select register | Load reg. | (spare) | Write register | Read reg 2 | Read reg 1 |

TABLE 14

Bit Descriptions

| Bit | Bit Name | Description |
|---|---|---|
| 0 (0x1) | Read Reg. 1 | Indicates that the primary read pointer will be loaded or selected. |
| 1 (0x2) | Read Reg. 2 | Indicates that the secondary read pointer will be loaded or selected. |
| 2 (0x4) | Write Reg. | Indicates that the write pointer will be loaded. |
| 3 (0x8) | (not used) | |
| 4 (0x10) | Load Reg. | When set the address sent next will be loaded into the selected register(s). |
| 5 (0x20) | Select Reg. | Setting this bit causes the read register indicated to be selected for reading in normal read mode. |
| 6 (0x30) | Alternate Mode | When set, the selection of which pointer is used for reading alternates with each data byte received |
| 7 (0x40) | Loop Back Mode | When set the microprocessor MISO and SPSCLK lines will be used to feed data into memory while clocking data out in normal read mode (NSS and NCMND high). |

Table 15 depicts a series of example enhanced transceiver commands.

TABLE 15

Example Commands

| Command | Value | Parameters | Description |
|---|---|---|---|
| Insert Data, reset Loopback/Alternate modes | 0x00 | (at least one byte of Raw data) | Raw data bytes are placed into FIFO as if they had come from an imager. Used for data storage and testing. Clears loop back and alternate bits as well. |
| Set Read Pointer 1 | 0x11 | 2 bytes Address | Stores a new value in the first read pointer |
| Set Read Pointer 2 | 0x12 | 2 bytes Address | Stores a new value in the second read pointer |
| Set Write Pointer | 0x14 | 2 bytes Address | Stores a value into the write pointer |
| Set Multiple Pointers | 0x13, 0x15, 0x16, 0x17 | 2 bytes Address | Stores a value for multiple pointers, as indicated by the least significant 3 bits. See note below for more information. |
| Select Read Pointer 1 | 0x21 | none | Selects the default read pointer as active |
| Select Read Pointer 2 | 0x22 | none | Selects the alternate read pointer as active |
| Set and Select 1 | 0x31 | 2 bytes Address | Sets and selects the default read pointer |
| Set and Select 2 | 0x32 | 2 bytes Address | Sets and selects the alternate read pointer |
| Set Alternate Mode 1 | 0x61, 0x71 | 0x61: none, 0x71: Address | Set the active read pointer to alternate with each byte read, starting with the default pointer. |
| Set Alternate Mode 2 | 0x62, 0x72 | 0x62: none, 0x72: Address | Set the active read pointer to alternate with each byte read, starting with the alternate pointer. |
| Loopback Data | 0x80 | (normally at least one byte of Raw data) | First Raw data bytes are placed into FIFO as if they had come from an imager. During subsequent normal data reads (NSS lines high) the MOSI data coming from the processor is written into the memory. This will provide a faster memory test or provide for processed image data to be stored while reading. |

Typical usage examples.

The following assume starting from a reset or empty pointer states: no loop back or alternate bits set, NReset, NSS, and NCMND bits High.
1) Gather One Image from the imager
   a) Set NSS Low
   b) Send Imager Commands
   c) Set NSS High
   d) Get Imager Data. Wait while READY low, read data when READY high.
2) Gather multiple images, normal reading:
   a) Set NSS Low
   b) Send Imager Commands
   c) Set NSS High
   d) Get Imager Data. Wait while READY low, read data when READY high.
   e) Periodically set the NCMND bit low at the expected time of completion of image data. Get the Write address and compare with the expected length.
   f) Once the preceding image has completed transferring to the FIFO, steps a-c can be repeated to start another image. Care must be taken to not fill the memory to a point where the write pointer passes the read pointer. The registers will roll over, but there is a physical limit to the chip
3) Gather image (or two images from one command) processing two halves of the data together using the Alternate Mode
   a) Set the NCMD bit Low
   b) Set NSS Low
   c) Sent the Alternate Mode command byte indicating a load of read pointer 2 (0x52).
   d) Calculate the Read Pointer 2 value from the known value of the Write Pointer. (ReadPtr2=WritePtr+1+Length of First part)
   e) Send the Most significant byte of Read Pointer 2
   f) Send the Least significant byte of Read Pointer 2
   g) Set the NCMND line High.
   h) Send Imager Commands
   i) Set NSS High
   j) Repeatedly set the NCMND bit low. Get the Write address and compare with the value set for Read Pointer 2. Set NCMND High. Once the write pointer has advanced past Read Pointer 2 continue on to the next step.
   k) Read data, monitoring the ready line for data availability. The first byte read will be the first byte received from the first image request. The second byte received will be accessed using Read Pointer 2.
4) Gather two images processing them using the Alternate Mode
   a) Set NSS Low
   b) Send Imager Commands
   c) Set NSS High
   d) Repeatedly set the NCMND bit low. Get the Write pointer value and compare with the expected length. Set NCMND High if not done.
   e) Once the initial image has completed transferring to the FIFO, set NCMND Low.
   f) Set NSS Low to enter command mode
   g) Sent the Alternate Mode command byte indicating a load of read pointer 2 (0x52). This will set the READY line Low when returning to read mode.
   h) Calculate the Read Pointer 2 value as one past the Write Pointer. (ReadPtr2=WritePtr+1)
   i) Send the Most significant byte of Read Pointer 2
   j) Send the Least significant byte of Read Pointer 2
   k) Set the NCMND line High.
   l) Send Imager Commands for second image.
   m) Set NSS High.
   n) Read data, monitoring the ready line for data availability. The first byte read will be the first byte received from the first image request. The second byte received will be the first byte of the second Image.
5) Use Loopback Mode to perform a memory test
   a) Set NSS and NCMND Low.
   b) Send the Loopback mode command (0x80).
   c) Send the first byte of the memory test. Additional bytes could be sent as well.
   d) Set NSS and NCMND High.
   e) Send the next test values while reading the previous test values until done.
   f) Set NSS and NCMND Low.
   g) Send the Normal mode command (0x00).
   h) Set NSS and NCMND High.
   i) Read the last byte to reset the Ready signal and pointers to the empty state.
6) Use Loopback and Alternate modes to process two images, storing an intermediate result on the chip. The maximum size images in this mode are 8191 if the original data needs to be retained and 10923 if the images can be overwritten by results.
   a) Set NSS Low
   b) Send Imager Commands
   c) Set NSS High
   d) Repeatedly set the NCMND bit low. Get the Write pointer value and compare with the expected length. Set NCMND High if not done.
   e) Once the initial image has completed transferring to the FIFO, set NCMND Low.
   f) Set NSS Low to enter command mode
   g) Sent the Alternate command byte indicating a load of read pointer 2 (0x52).
   h) Calculate the Read Pointer 2 value as one past the Write Pointer. (ReadPtr2=WritePtr+1)
   i) Send the Most significant byte of Read Pointer 2
   j) Send the Least significant byte of Read Pointer 2
   k) Set the NCMND line High.
   l) Send Imager Commands for second image.
   m) Set NSS High.
   n) Wait for the second image to be complete by monitoring the Write Address.
   o) Read the first pixel of data from each image.
   p) Go to Command Mode (NCMND and NSS Low), send Alternate Loopback (0xC0). Set NSS and NCMND High.
   q) Perform required operations on Pixel data, Prepare two bytes of results to output to Queue.
   r) Read next two pixels of data while transmitting results calculated.
   s) Continue until done reading data.
   t) Go to Command Mode, Send Normal (0), Set NSS and NCMND bits high.
   u) Note that the last two results could be put into the Queue if needed, but since these are likely to be the sum check, it is unlikely that these results are needed.
Continue to Read and process the result data.

Figure 9A:
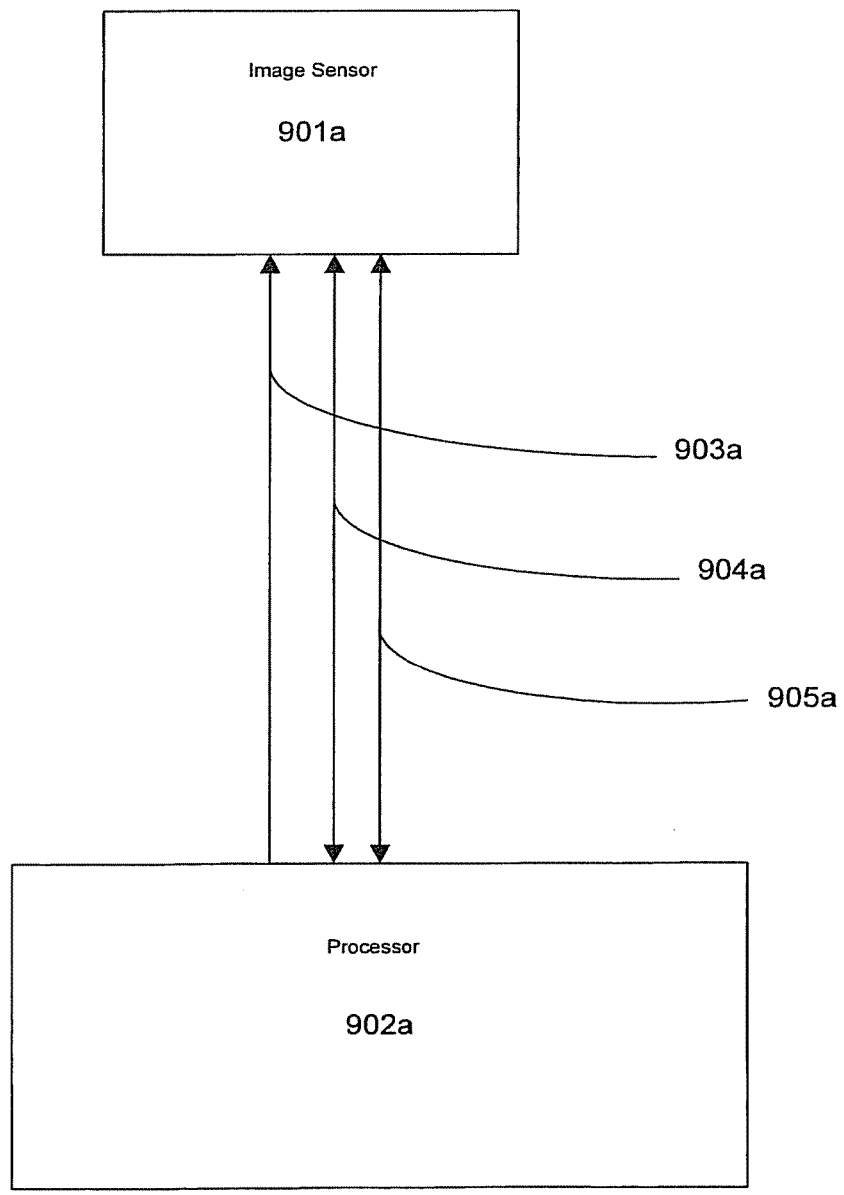

A first embodiment of a mother board/imager board interconnection is shown in FIG. 9a. An image sensor chip 901a communicates with a processor 902a over a common bi-directional synchronous serial bus. The bus contains three signals: NSS 903a (NOT Slave-Select), MOSI 904a (data Master-Out-Slave-In), and SPSCKL 905a (serial clock). The NSS signal is uni-directional and allows the microcontroller to indicate to the image sensor if it is a bus slave (high-impedance input for receiving data) or a master (transmitting data). The microcontroller can set NSS low and send instructions to the image sensor for image acquisition over the MOSI and SPSCLK lines. When NSS is set high, the image sensor executes image acquisition according to the instructions and returns the image data over the bus. The bus signals are typically operated at CMOS logic level for the power supply used, typically 5.0V or 3.3V.

Figure 9B:
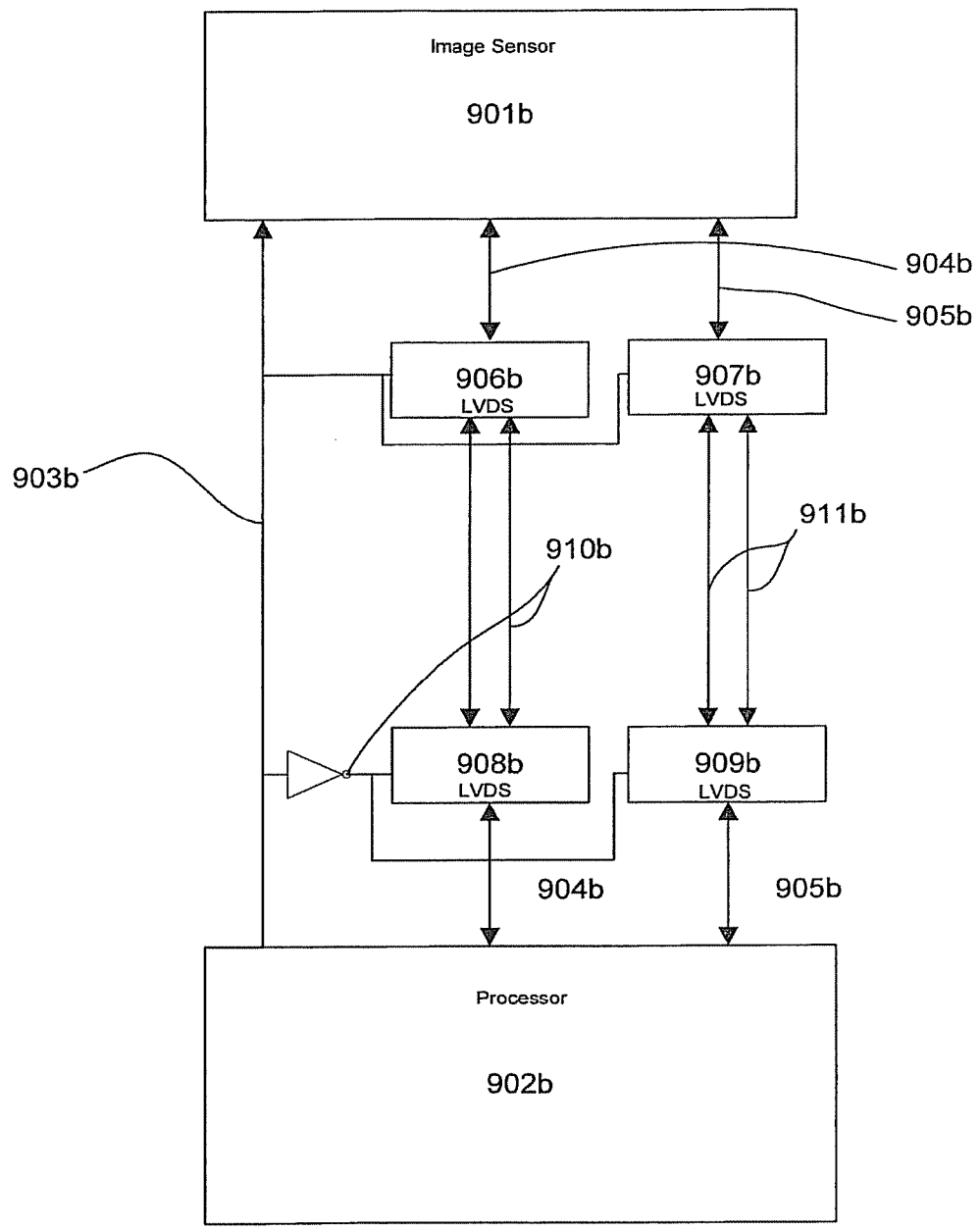

Another embodiment of a mother board/imager board interconnection shown in FIG. 9b, utilizes bi-directional low-voltage-differential-signaling (LVDS) for communication between the image sensor 901b and the processor 902b. With this method, digital signals MOSI 904b and SPSCLK 905b are converted to differential pairs 910b and 911b by LVDS transceiver blocks 906b, 907b, 908b, and 909b. LVDS signals provide several advantageous. First, the use of a differential pair substantially increases noise immunity and is far more tolerant to any ground reference difference between the imager and the microprocessor. Secondly, the lower voltage signals (about −0.3V to +0.3V) emit substantially less electromagnetic interference than 5.0V or 3.3V digital signals.

An exemplary LVDS transceiver block is shown in FIG. 9j. A Fairchild Semiconductor FIN1019 LVDS driver 901j is used. Data signal 904j may be either a MOSI signal or an SPSCLK signal. The NSS signal 903j1 indicates the direction of data transfer. D+ and D− signals form a differential pair 910j1, 910j2. In the example shown in FIG. 9b, the polarity is set for the image-sensor side transceivers 906b, 907b. Thus, when NSS is low, data reception is enabled. For the controller side transceivers 908b and 909b an opposite polarity signal is provided to driver's 901j DE and NRE inputs by the controller. In this and other embodiments, imager instruction and parameter data is communicated over the same bi-directional bus as the acquired digital image.

It is also possible to provide two unidirectional busses, one for providing instructions and parameters from the processor to the image sensor and a separate bus for transmitting image data from the image sensor to the processor. In this case, the instruction and parameter bus may not have the high data rate requirements of the image data bus and therefore may be implemented using a simple technique such as a UART. The image data bus may be a unidirectional high speed digital bus, such as an LVDS bus, or may even be an analog signal, such as the common NTSC video standard, which is then digitally sampled at the processor.

Figure 9C:
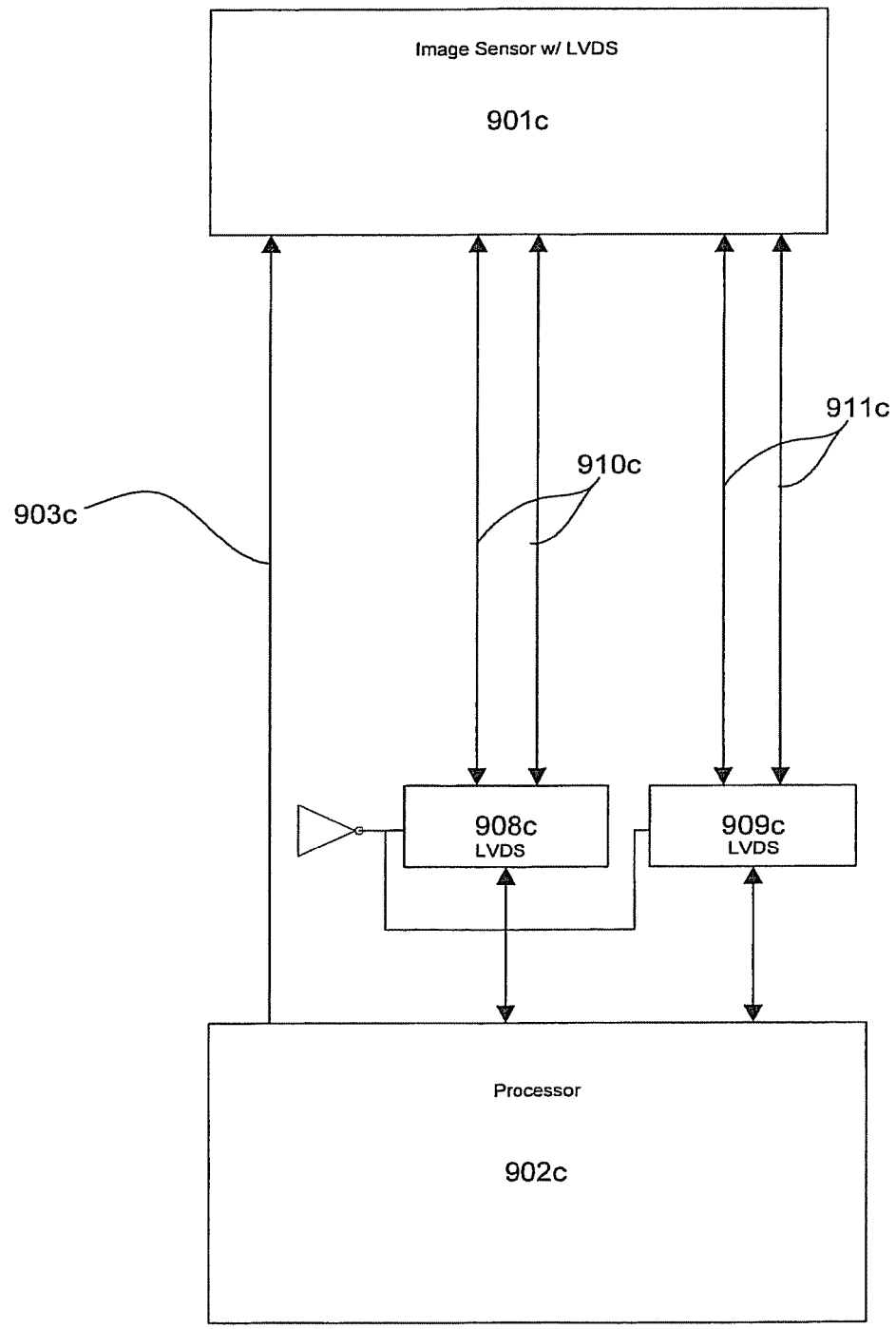

FIG. 9c illustrates an embodiment similar to that of FIG. 9b. However, in the FIG. 9c embodiment the image sensor side LVDS transceivers are integrated into the imager 901c along with the other components of this device. This integration reduces the part count, component cost, and imager board area associated with the image sensor side LVDS transceivers 906b, 907b. As shown, the processor 902c side LVDS transceivers 908c, 909c remain with respective data 910c, clock 911c and NSS 903c interconnections. It should be understood that communication protocols such as a serial bus, LVDS serial bus, a parallel bus, a UART, optical fiber, SPI bus, IIC bus, CAN bus, J1815 bus, LIN bus, MOST bus, USB, fire-wire, or even a wireless link (e.g. Bluetooth) may be used to transmit data from the imager to the processor, from the processor to the imager and two individual communications connections can be employed with one for imager-to-processor communication and a second for processor-to-imager communication.

There are several applications where multiple image sensors may be utilized. For example, automatic vehicle exterior light control and moisture sensing are both applications which can be performed utilizing image sensing and processing. However, the optical requirements of both features are substantially different. An exterior light control imaging system must be designed to image small light sources at a distance and provide some color discrimination. A moisture sensing imaging system typically images a surface of a windshield. To better image the surface of a windshield, it is advantageous to tilt the image sensor forward. Furthermore, it is advantageous to provide supplemental illumination for an image sensor (such as an LED) and optionally to limit the spectral sensitivity of the imaging system to the spectral band of the illuminator. Specifically, it is most advantageous to use an infrared (IR) LED which is not visible to the vehicle driver or passengers and limit the sensitivity of the imaging system to the IR spectrum. As a result, the preferred optical configurations of a moisture sensing imaging system are often incompatible with the preferred optical configurations of an exterior light control imaging system, at least through means which are economical for wide adaptation of both features. Other vehicle imaging features may also be combined with exterior light control, moisture sensing or they may be incorporated with each other. These features may include but are not limited to: adaptive cruise control, collision warning or avoidance, weather condition detection, lane departure warning, blind spot warning, night vision, and driver drowsiness detection. Some of these features may be combined with each other utilizing a single image sensor and some may be combined through the use of multiple image sensors.

Another useful application requiring multiple image sensors is stereoscopic imaging. A stereoscopic imaging system utilizes at least two image sensors spaced apart from each other. The parallax effect causes objects at different distances to be imaged with different displacements relative to each other onto each image sensor. Very distant objects will be imaged onto the same location on each sensor. This effect can be used to obtain an accurate measurement of the distance of an object. This stereoscopic principle can be used for moisture sensing as described in commonly assigned U.S. Pat. Nos. 5,923,027 and 6,617,564 and U.S. patent application Ser. No. 09/970,728, the disclosures of which are incorporated in their entireties herein by reference, exterior light control, or any of the previously mentioned applications.

Figure 9D:
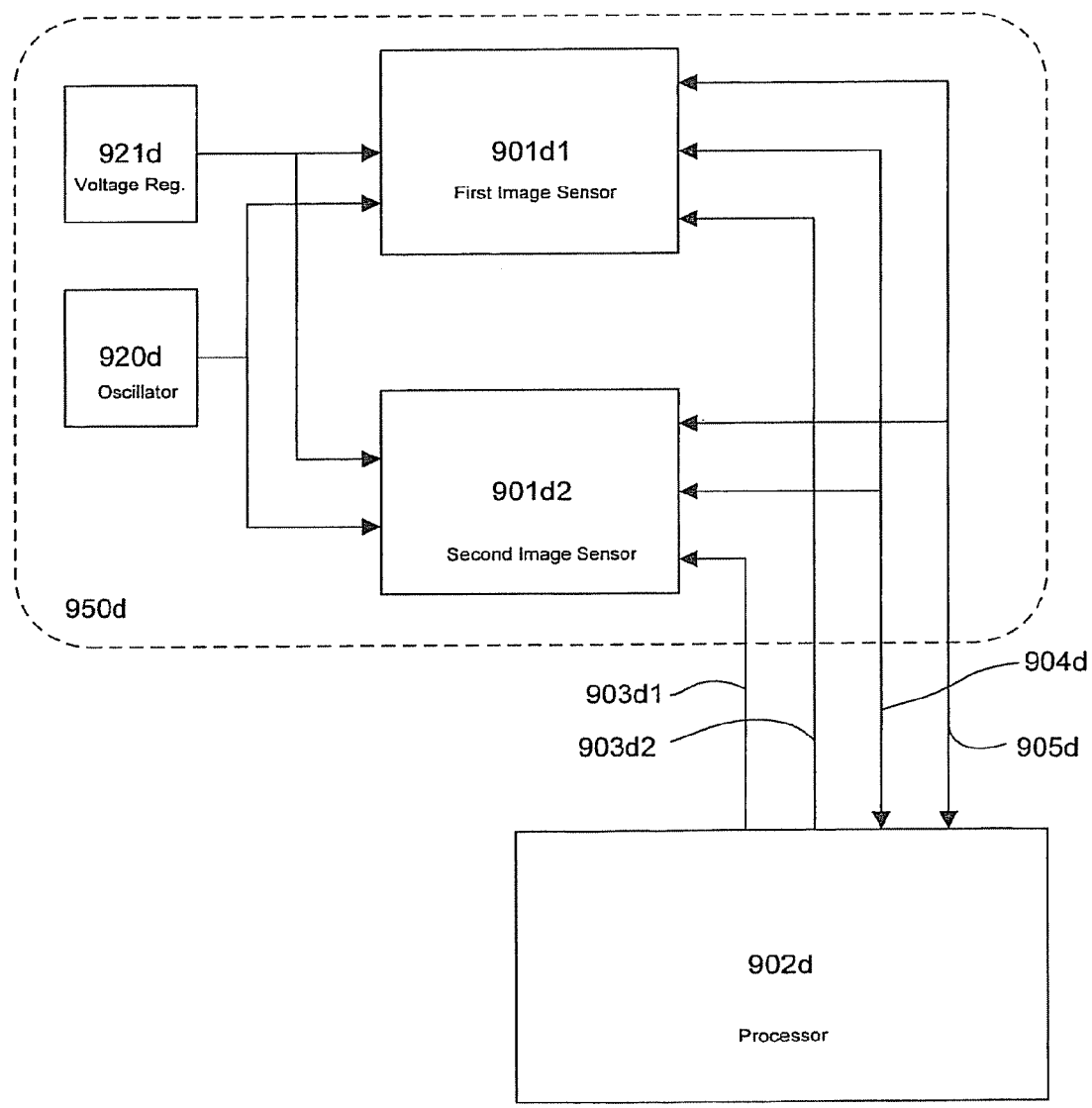

FIG. 9d illustrates an embodiment of the present invention which provides a highly economic means of providing a vision system including two or more image sensors. Two image sensors 901d1, 901d2 are provided on printed circuit board 950d. Components common to both image sensors such as power supply 921d and oscillator 920d may be shared to reduce cost. Image sensors 901d1, 901d2 share a common bus for communication with a processor 902d which comprises signals MOSI 904d and SPSCLK 905d. Each image sensor is preferably provided with its own enable/direction signal NSS 903d1, 903d2.

Operation proceeds as follows: In order to acquire an image from image sensor 901d1, image sensor 901d2 output is disabled and placed in a tri-state input mode by setting NSS-2 903d2 low. Instructions are loaded into image sensor 901d1 from the microcontroller by setting NSS-1 903d1 low while communicating instructions to image sensor 901d1 over MOSI 904d and SPSCLK 905d signals. After instructions are loaded, NSS-1 903d1 is set high allowing the acquisition process to begin and enabling output from image sensor 901d1. During this entire period NSS-2 903d2 remains low. When acquisition from image sensor 901d1 is complete additional images may be acquired from image sensor 901d1 or images may be acquired from image sensor 901d2.

To acquire images from image sensor 901d2 signal NSS-1 903d1 is set low disabling output from image sensor 901d1. Next, NSS-2 903d2 is set high and then low to reset the image sensor and enable instruction loading. Image instructions are then communicated to image sensor 901d2 over signals MOSI 904d and SPSCLK 905d. NSS-2 903d2 is then set high enabling acquisition and readout of the image from image sensor 901d2. During the entire process of acquiring images from image sensor 901d2, NSS-1 903d1 remains low.

The above process may continue indefinitely and in any order. Image acquisition may alternate between imagers or each imager may take multiple images sequentially. The use of each imager may depend upon the activation of features for which each imager is configured. Also, any number of image sensors may be provided on the common bus by adding the corresponding number of NSS lines.

The present invention may also be implemented with a variety of bus schemes. For example a parallel bus may replace the serial bus. The bus may also be an radio frequency interconnection, a light ray interconnection, or a fiber optic interconnection rather than a hardwired interconnection. The present invention comprises a shared bus for communication between one or more image sensors and one or more processors and means for selecting an image sensor. The means for selecting an image sensor may be through discrete signals, such as signals NSS-1 and NSS-2, through an address bus, or through an address or identifier sent over the data communication bus. The later example may be implemented for example by sending and identifier/command instruction over the bus. An identifier allows each imager to determine if it should respond to the following command. The command may be an image acquisition instruction or a "go-to-sleep" instruction. A "go-to-sleep" instruction would allow the disabling of the image sensor(s) not acquiring images to prevent any bus interference with the active sensor. Non active image sensors would become active when an acquisition instruction is issued for the sensors address. Image sensor addresses may be set in hardware through digital inputs which are wired either high or low to set the address. This way each image sensor may be given a unique address.

While the embodiment of FIG. 9d shows image sensors 901d1 and 902d2 co-located on a single circuit board, the present invention can also be implemented with image sensors located on different circuit boards or even in different general locations on, or in, a vehicle. In these cases, it may not be convenient to share some components such as voltage regulator 921e and oscillator 920e, however the use of a common bus still provides economic advantage. When combining a moisture sensor with another function it may be necessary to incline the moisture sensor imaging plane while leaving the other imaging sensor such that the imaging plane is perpendicular to plane of the road. Several methods will facilitate this. The moisture sensor imager may be provided on a separate circuit board connected to the other circuit board through wires or flex circuit. The moisture sensor may be provided on a break-away section of the circuit board. Such a configuration would allow the image sensor sub-assembly to be manufactured on a flat circuit board and then the portion of the board containing the moisture sensor imager can be broken off and bent at the appropriate angle. Electrical connection may be maintained through wire jumpers. Finally, the image sensor sub-assembly may be manufactured on a flexible circuit board allowing the two image planes to be different.

Figure 9E:
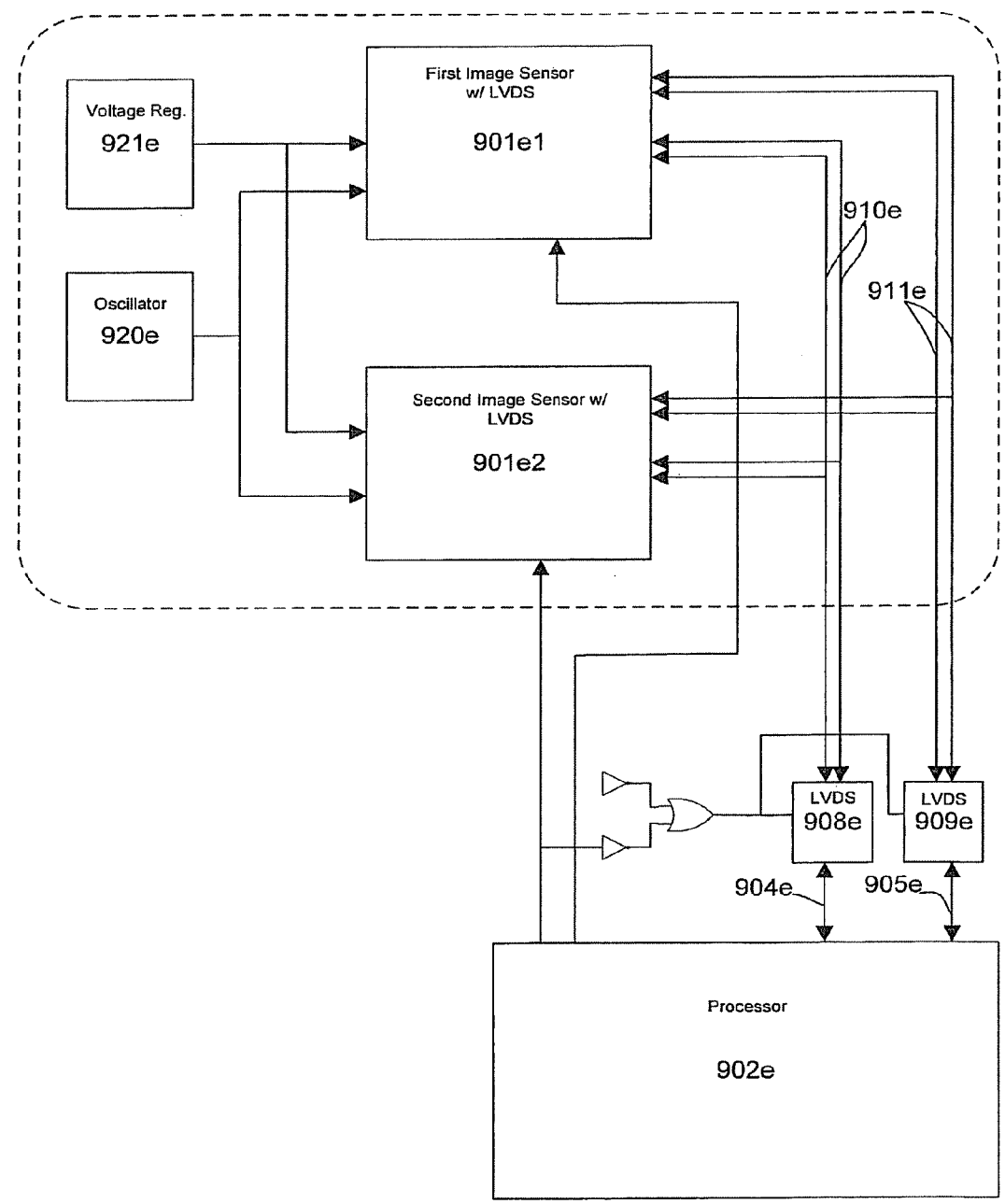
Figure 9F:
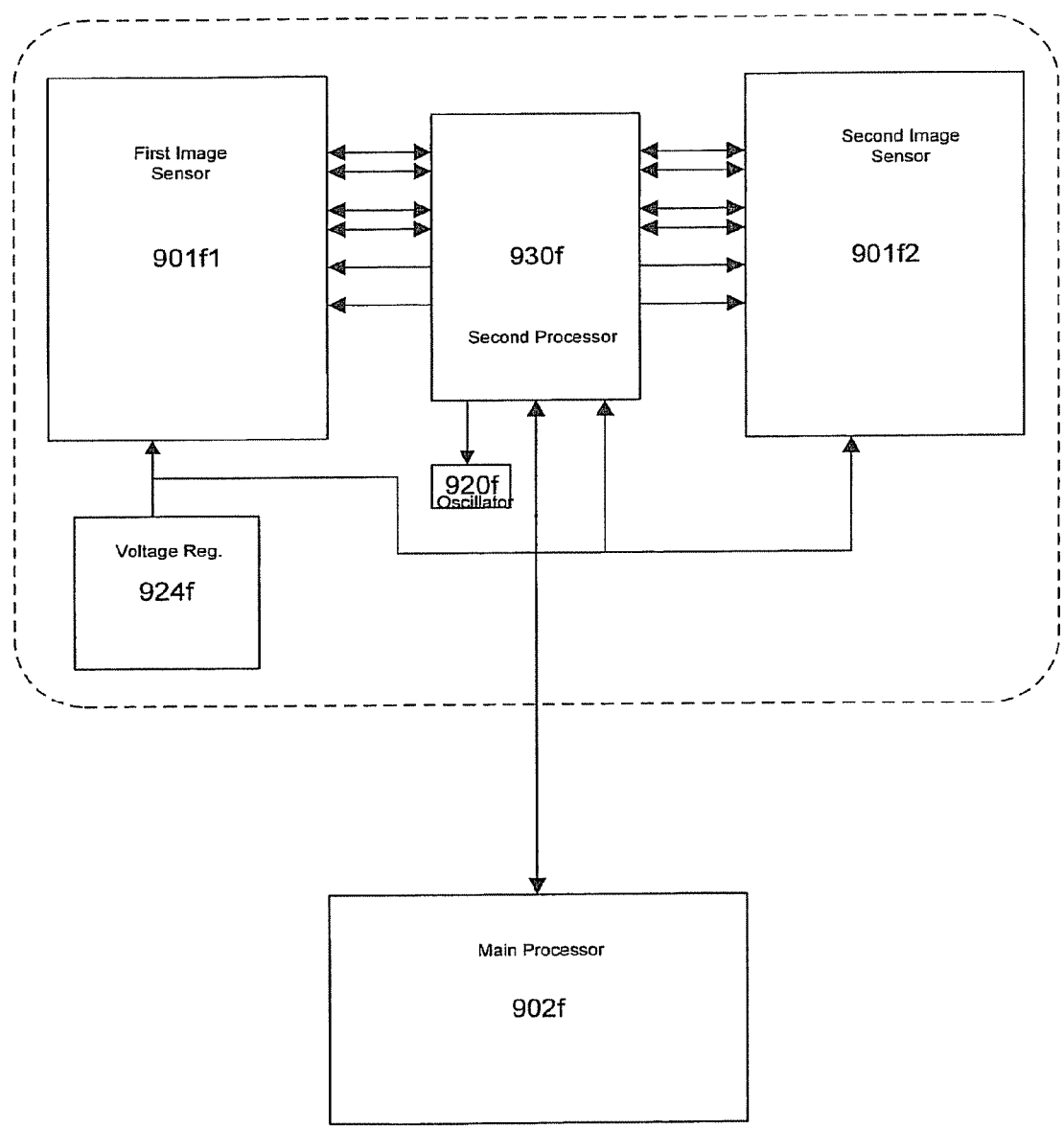

The embodiment of FIG. 9f is similar to that of FIG. 9d except that signals MOSI 904e and SPSCLK 905e from processor 902e are converted to differential pairs 910e, 911e as described before in reference to FIGS. 9b and 9c using LVDSs 908c, 909c, respectively. The embodiment shown in FIG. 9e is drawn such that each image sensor contains a LDVS transceiver, however external transceivers can also be used. In this case, the transceivers may be shared by the image sensors.

The embodiment of FIG. 9f illustrates a multiple processor solution. In this embodiment, a second processor 930f communicates with one or more image sensors 901f1, 901f2 and performs some or all of the image processing associated with these sensors. Processor 930f communicates with main processor 902f which may be located remote from imager board. The data communicated may be entire images, a subset of the images, compressed images, the results of pre-processed images, or a decision on an action to take based upon processing of at least one image. Main processor 902f may communicate to second processor 930f various information such as parameters for processing, activation of various features, and vehicle status information. Main processor may perform a portion of the image analysis, or may make a control decision based upon information communicated from second processor 930f. The main processor 902f may also perform communication with the vehicle either through discrete wiring or through a bus such as the CAN bus. Main processor 902f may also perform other functions such as control of an electro-optic mirror. It is also contemplated that main processor 902f may be a central processor, such as a "body controller", which is typically responsible for multiple vehicle equipment functions. In this way second processor 930f can be responsible for the computation and data intensive image analysis tasks and main processor 902f may determine and execute a final control decision based upon the results of processing from 930f and possibly other vehicle information. Voltage regulator 924f and oscillator 920f may be provided.

Communication between main processor 902f and second processor 930f may be through a variety of means. Since the entire raw image data is not necessarily transmitted from second processor 930f to main processor 902f this communication link may be more flexible and of potentially lower bandwidth than the communication links between the imager and the processor. Example communication links include: a serial bus, LVDS serial bus, a parallel bus, a UART, optical fiber, SPI bus, IIC bus, CAN bus, J1815 bus, LIN bus, MOST bus, USB, fire-wire, or even a wireless link (e.g. Bluetooth).

Second processor may be a microcontroller, digital signal processor (DSP), field-programmable gate array (FPGA), complex programmable logic array (CPLD), application specific integrated circuit (ASIC), or the like. It is also possible to integrate second processor 930f with one or more image sensors 901f1, 901f2. In a preferred embodiment second processor is implemented with an FPGA such as a Cyclone™ series FPGA available from Altera Corporation of San Jose, Calif. Such a device provides sufficient I/O to communicate with each of one or more image sensors 901f1, 901f2 independently and thus allow simultaneous operation of each imager. Communication with each imager may be serial (optionally LVDS) or parallel. The FPGA may be programmed to implement a microprocessor to execute image analysis software.

Significant performance improvement in image analysis algorithm execution can be gained by using an FPGA over a conventional DSP or microcontroller. Increases in computational capability and efficiency may allow the use of higher resolution arrays or the implementation of more sophisticated algorithms which may increase the performance of the system. Higher performance may allow simultaneous analysis of images with acquisition eliminating the need to store full images to memory and thus potentially reducing memory cost. Finally, higher performance and efficiency may also allow the provision of more functionality or additional efficiency.

For a first example of the performance improvements realized with an FPGA consider a filter used in a moisture sensing application to detect edges which is implemented as a 3×3 kernel as described in U.S. Pat. No. 6,923,027, entitled Moisture Sensor and Windshield Fog Detector Using an Image Sensor, commonly assigned and hereby incorporated by reference. Traditional software implementation of this filter requires sequential multiplication of a coefficient to neighboring pixels and accumulation of the products. This process must be preformed for every pixel in the image thus resulting in a very computationally intensive algorithm. With an FPGA, this filter may be implemented in digital logic, thus allowing parallel execution of the kernel computation and reducing overall processing time.

In a known exterior light control system, as described in commonly assigned U.S. patent application Ser. No. 10/645,801, the disclosure of which is incorporated in its entirety herein by reference, detection of oncoming headlights and preceding taillights is accomplished by looking for brightness peaks in the image. Brightness peaks are detected by comparing the grey scale value of the current pixels with its neighboring pixels to determine if the current pixel is a peak. With a conventional microcontroller, these comparisons are typically made sequentially. Since the test is performed on every non-zero pixel, the process can be computationally time consuming. With an FPGA, the peak-detect comparisons may be much more efficient by implementing parallel comparisons between the current pixel and its neighbors in circuitry, thereby increasing the performance of the device.

As a final example of the use of a FPGA consider the probability function based algorithms and neural network analysis techniques described in the previously referenced '879 patent application. Neural network implementation requires the computation of several dot-products between an input vector and a weight vector. Each of these dot products must be computed by sequential multiply-accumulate operations on a conventional microcontroller or DSP. However, with an FPGA the computation of these dot products may be performed in parallel or at least partially in parallel by implementing several multipliers which operate simultaneously. In smaller FPGAs sufficient resources may not be available to implement all the desired hard wired functions. However, these devices can be partially reprogrammed on-the-fly when different functions are required. For example, the device can be programmed to implement a kernel filter for moisture sensing and later reprogrammed implement a peak-detect when headlamp control analysis is being performed.

Figure 9G:
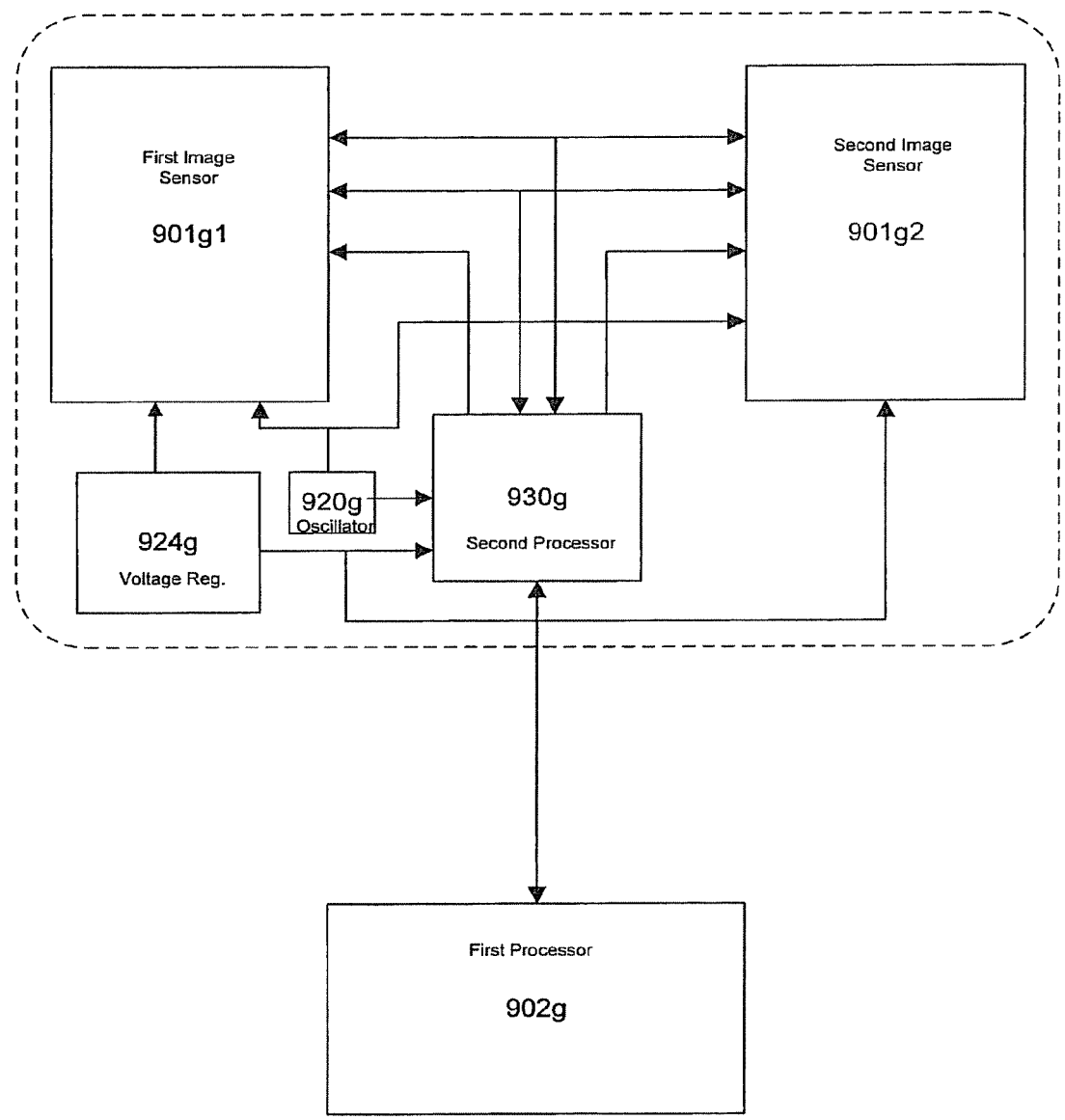

FIG. 9g illustrates another embodiment of a mother board/ imager board interconnection supporting one or more image sensors 901g1, 901g2 with a processor 930g local to the image sensors. In this case, the image sensors are connected by a common bus, similar to the embodiments of FIG. 9d, however, each image sensor is connected to the second processor 930f directly. As with the other embodiments discussed herein, multiple image sensors may share a power supply 924g, an oscillator 920g, a main processor 902g and second processor 930g.

Figure 9H:
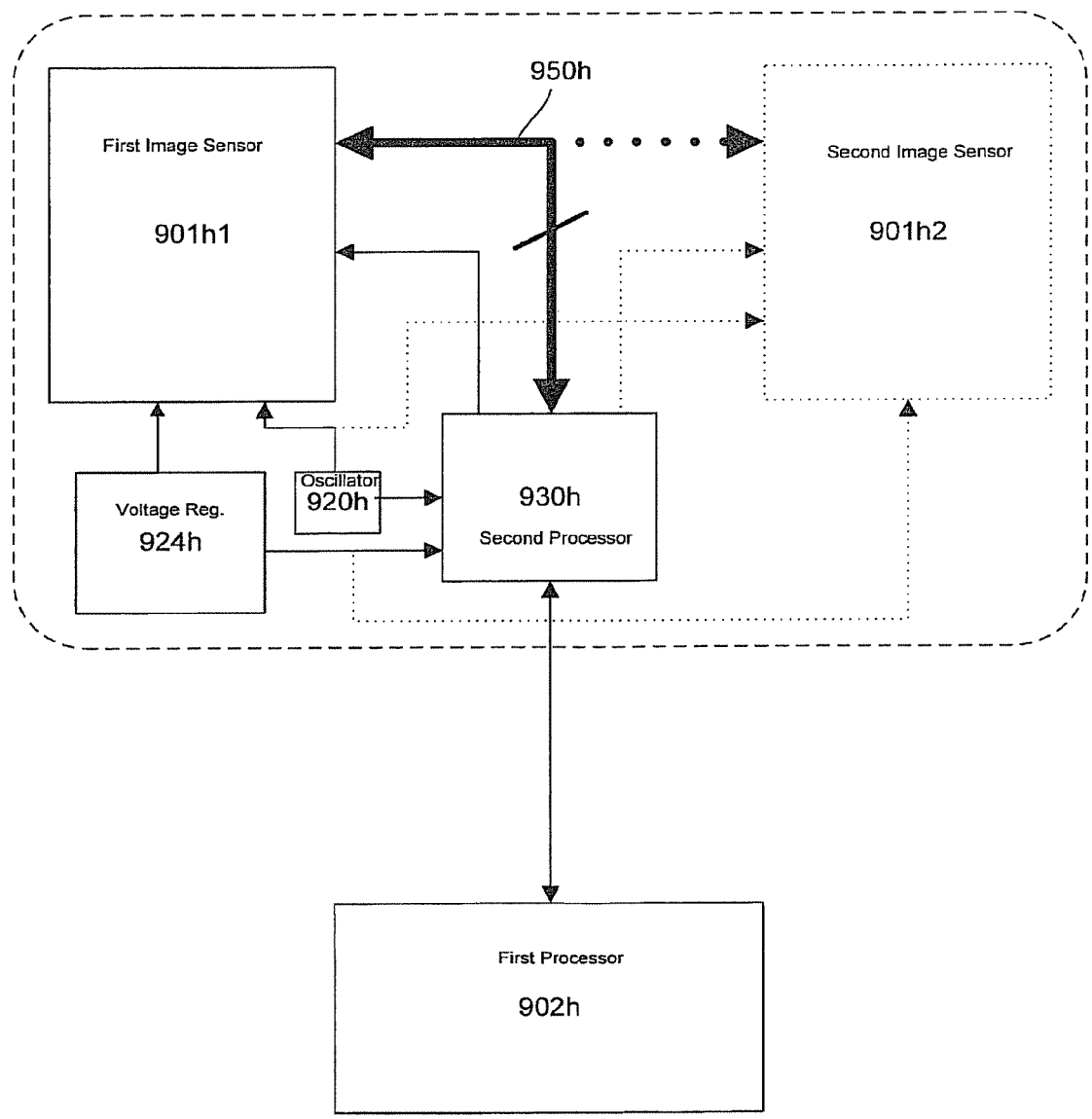

Several commercially available image sensors utilize a parallel bus for communication of image data. These devices typically use a 4, 8, or 10 bit wide bus. An example image sensor utilizing a parallel bus is a CIF format image sensor part number MI-0111 available from Micron, Inc. of Boise, Id. As shown in FIG. 9h, one or more parallel bus image sensors 901h1, 901h2 can be used more effectively when a second processor 930h is located on a common circuit board with the image sensors. As with the other embodiments discussed, multiple image sensors may share a common bus 950h, power supply 924h, oscillator 920h, a main processor 902h and a second processor 930h. Multiple image sensors with a parallel bus may also be connected individually to second processor 930h as is the case with the serial bus image sensors shown in FIG. 9f. In situations where parallel bus image sensors are used and a second processor 930h cannot be mounted on a common circuit board, a flex circuit cable may be used to connect the systems or a parallel-to-serial converter IC, such as the National Semiconductor DS92LV1021 may be used to convert the parallel data bus to an LVDS bit stream.

Figure 9I:
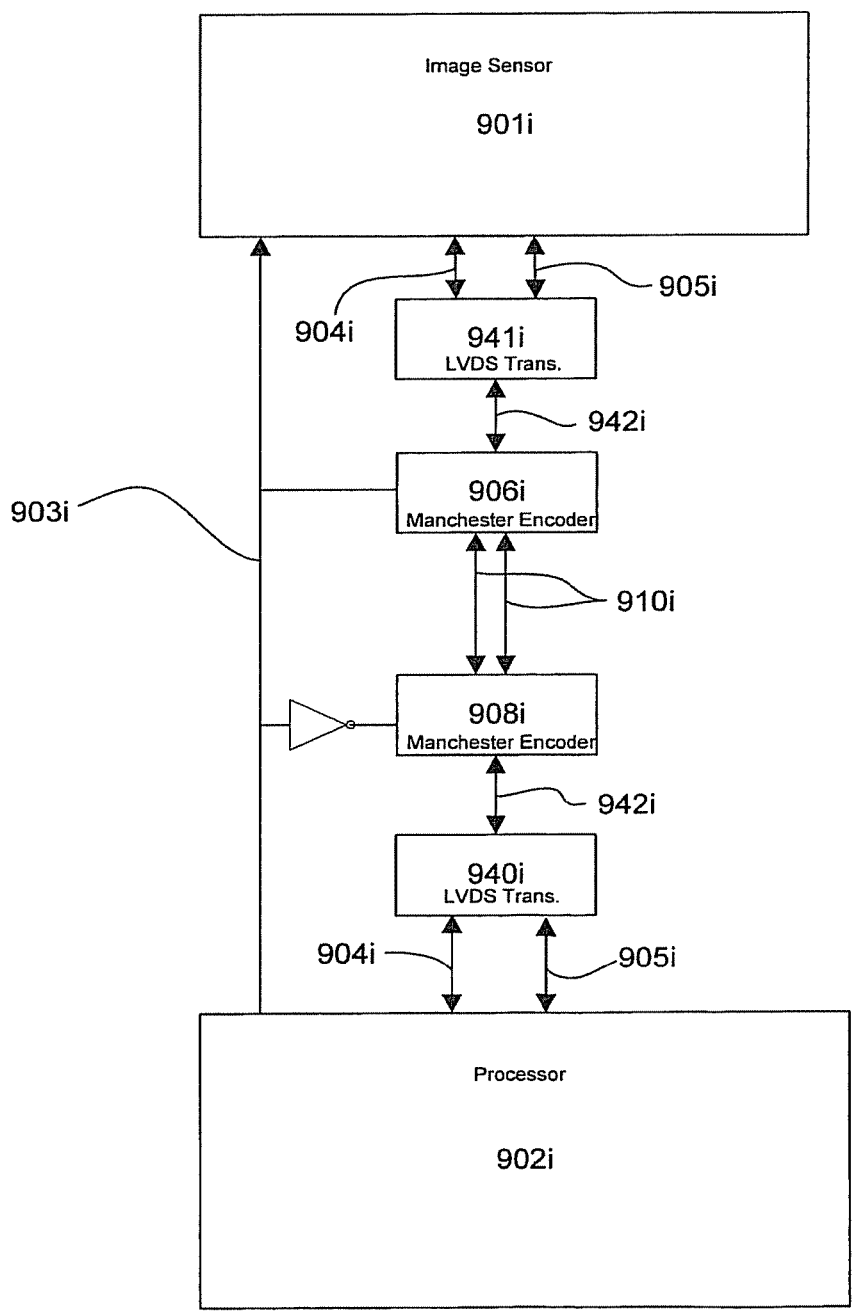

One disadvantage of the use of an LVDS serial bus as shown in FIGS. 9b, 9c and 9e over the single ended bus of FIG. 9a is the increase in the number of wires required to transmit the signals. The additional wires may increase the cost of the related wiring harness and may make wire routing more difficult. This limitation can be overcome by encoding the clock signal SPSCLK onto the same line as the data signal MOSI through Manchester coding or other similar means. In this case the transmitted bit rate is doubled in exchange for combining the clock or data into a single signal. In most cases the doubled rate data can still be robustly transmitted through an LVDS link. This embodiment is illustrated in FIG. 9i. The MOSI 904i and SPSCLK 905i signals are combined onto a single signal 942i using a Manchester encoder/decoder 940i. An example Manchester encoder/decoder is part number HD-15530 available from Intersol. Signal 942i is converted to LVDS by transceiver 908i and transmitted to the imager subassembly. LVDS transceiver 906i restores single ended signal 942i and Manchester encoder/decoder 9411 restores signals MOSI 904i and SPSCLK 905i. It is envisioned that LVDS transceivers 941i or 940i may be combined with Manchester encoders 906i or 908i and either or both of these may be combined with the image sensor 901i or the processor 902i. This scheme may also be applied with any of the previously disclosed embodiments including one or more image sensors and processors.

Figure 10:
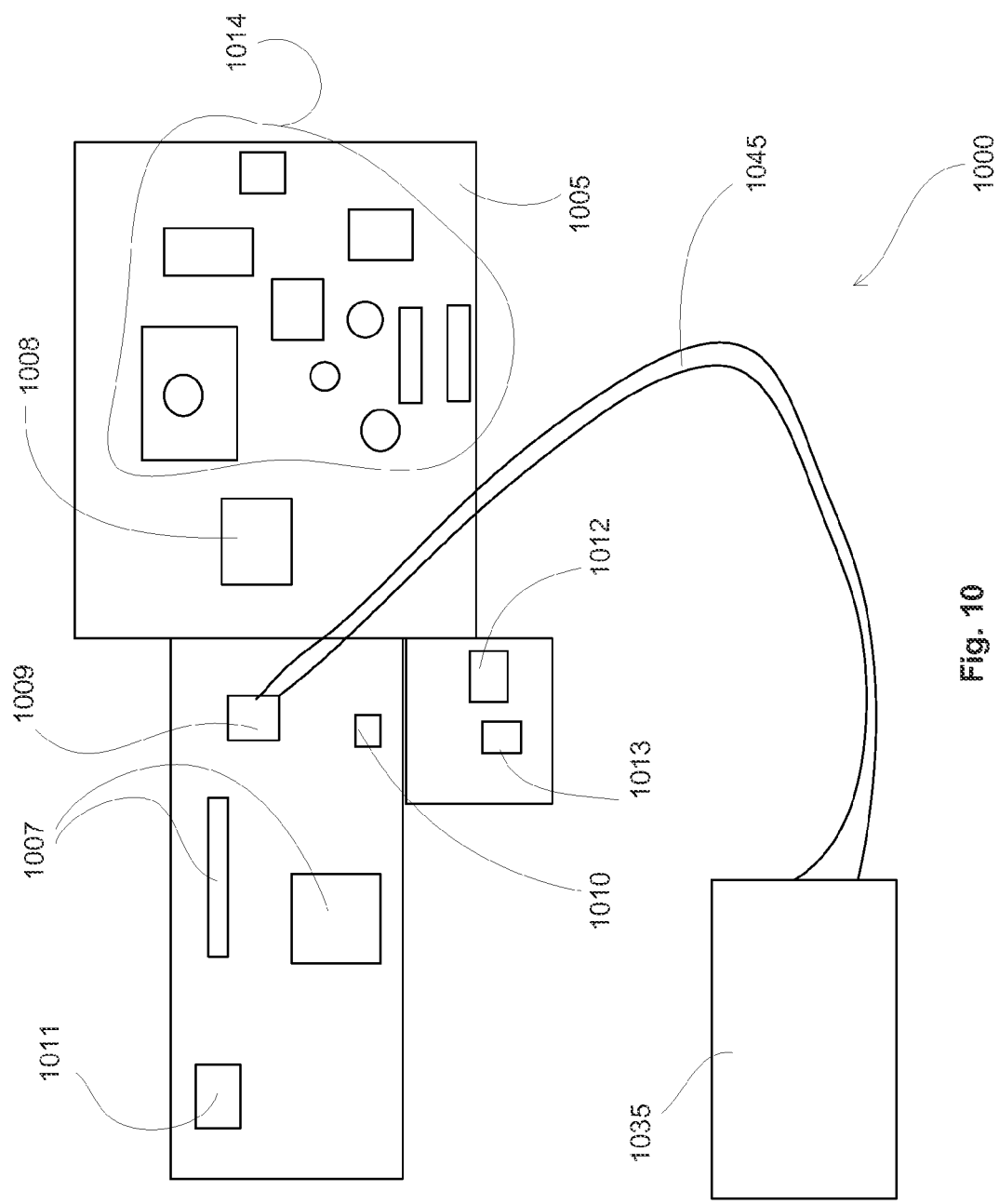
FIG. 10 depicts a plan view of a second embodiment of a mother board, a breakaway board and an imager board interconnected.

With reference to FIG. 10, another embodiment of an automatic vehicle equipment control system 1000 is depicted comprising a mother board 1005 interconnected with an imager board 1035 via a mother board/imager board interconnection 1045. A breakaway board 1012 is depicted prior to breaking away from the mother board. The mother board further comprises a vehicle bus interface 1010, vehicle equipment connectors 1007, a processor 1008, a enhanced transceiver 1009, an ambient light sensor 1011 and an electro-optic element drive circuit 1014. The breakaway board comprises a glare light sensor. When broken away, the breakaway board may be interconnected to the mother board as shown with regard to FIGS. 5a and 5b with reference to the glare sensor board 512a.

Figure 11A:
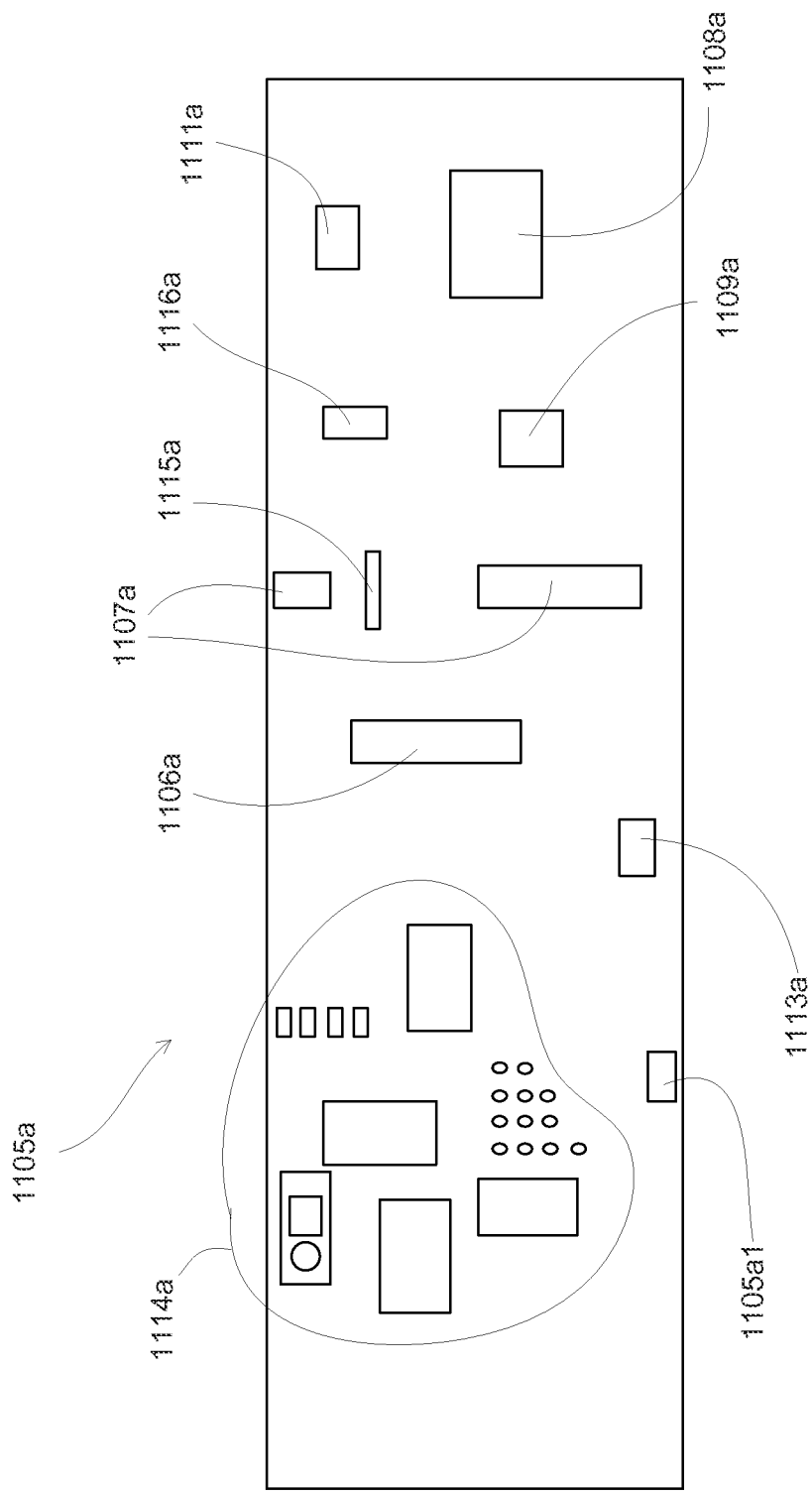
FIG. 11a depicts a plan view of a third mother board.

Turning now to FIGS. 11a and 11b, another embodiment of a mother board 1105a, 1105b is depicted to comprise all components mounted on a first side 1105a1. Even the glare light sensor 1136a, 1136b is mounted to the first side and is aligned with a hole through the mother board such that light rays are detectable in a desired direction generally rearward of a controlled vehicle. As can be seen, there are no components mounted to the second side 1105b2. This configuration is preferable in regard to manufacturing of certain embodiments. The mother board further comprises an imager board interconnection connector 1106a, vehicle equipment connectors 1107a, a processor 1108a, a enhanced transceiver 1109a, a surface mount ambient light sensor 1111a, a reverse surface mount glare light sensor 1113a and an electro-optic mirror element drive circuit 1114a.

Although the present invention has been described with reference to various embodiments and specific examples, it should be understood that the scope of the present invention should not be limited to the specific teachings herein. Equivalents may occur to one skilled in the art upon reading this detail description in light of the drawings and appended claims. The scope of the invention is intended to be construed in light of the doctrine of equivalents as define in evolving case law.

What is claimed is:

1. An automotive equipment control system comprising:
   at least one imager comprising:
      at least one image sensor configured to acquire an image;
   a first processor configured to analyze said image, such that a second processor can make a control decision in order to automatically perform a vehicle equipment related function based on information communicated from said first processor configured to analyze said image; and
   an interconnection configured to transmit data between said imager and said first processor for analyzing said image;
   wherein said interconnection is configured to operate up to at least one megabaud without emitting unacceptable electromagnetic interference.

2. The automotive equipment control system of claim 1, wherein said interconnection is a low voltage differential signal (LVDS) interconnection.

3. The automotive equipment control system of claim 2, wherein said LVDS is configured to have an approximately 300 mV swing.

4. The automotive equipment control system of claim 1, wherein said first processor is a field gate programmable gate array (FPGA).

5. The automotive equipment control system of claim 1, wherein said first processor is an application specific integrated circuit (ASIC).

6. The automotive equipment control system of claim 1, wherein said vehicle equipment related function is an exterior light control system.

7. The automotive equipment control system of claim 6, wherein said at least one imager is further configured to acquire at least one image at a first integration period and at least one image at a second integration period.

8. The automotive equipment control system of claim 1, wherein said at least one imager comprising multiple imagers for stereoscopic vision, such that two imagers are spaced apart from one another to provide capability for accurate distance measurement of objects.

9. The automotive equipment control system of claim 1 further comprising an illuminator configured to provide supplemental illumination.

10. The automotive equipment control system of claim 9, wherein said illuminator comprising an infrared light emitting diode, which is not visible to the vehicle driver or passengers.

11. The automotive equipment control system of claim 1, wherein said vehicle equipment related function comprises collision warning or avoidance, weather condition detection, lane departure warning, and exterior light control.

12. The automotive equipment control system of claim 1, wherein said interconnection is configured for a data signal and a clock signal encoded onto a same line through Manchester coding.

13. An automotive equipment control system comprising:
    at least one imager comprising:
       at least one image sensor configured to acquire an image;
    a first processor configured to analyze said image, such that a second processor can make a control decision in order to automatically perform a vehicle equipment related function based on information communicated from said first processor configured to analyze said image; and
    an interconnection configured to transmit data between said imager and said first processor for analyzing said image;
    wherein said interconnection is a low voltage differential signal (LVDS) interconnection;
    wherein said vehicle equipment related function comprises exterior light control.

14. The automotive equipment control system of claim 13, wherein said interconnection is configured to operate up to at least one mega baud without emitting unacceptable electromagnetic interference.

15. The automotive equipment control system of claim 13, wherein said LVDS is configured to have at least an approximately 300 mV swing.

16. The automotive equipment control system of claim 13, wherein said first processor is one of a field gate programmable gate array (FPGA) and an application specific integrated circuit (ASIC).

17. The automotive equipment control system of claim 13, wherein said at least one imager comprising multiple imagers for stereoscopic vision, such that two imagers are spaced apart from one another to provide capability for accurate distance measurement of objects.

18. The automotive equipment control system of claim 13 further comprising an illuminator configured to provide supplemental illumination, said illuminator comprising an infrared light emitting diode, which is not visible to the vehicle driver or passengers.

19. The automotive equipment control system of claim 13, wherein said vehicle equipment related function further comprises at least collision warning or avoidance, weather condition detection, and lane departure warning.

20. An automotive equipment control system comprising:
    at least one imager comprising:
       at least one image sensor configured to acquire an image;
    a first processor configured to analyze said image, such that a second processor can make a control decision in order to automatically perform a vehicle equipment related function based on information communicated from said first processor configured to analyze said image;
    wherein said first processor is one of a field gate programmable gate array (FPGA) and an application specific integrated circuit (ASIC), and
    an interconnection configured to transmit data between said imager and said first processor for analyzing said image;
    wherein said interconnection is a low voltage differential signal (LVDS) interconnection;
    wherein said interconnection is configured to operate up to at least one megabaud without emitting unacceptable electromagnetic interference;
    wherein said vehicle equipment related function comprises exterior light control, collision warning or avoidance, weather condition detection, and lane departure warning.

* * * * *